US 9,348,994 B2

(12) United States Patent
Kondoh

(10) Patent No.: US 9,348,994 B2
(45) Date of Patent: May 24, 2016

(54) INFORMATION PROCESSOR AND SYSTEM THAT ASSOCIATE JOB AND USER INFORMATION BASED ON JOB IDENTIFIER

(71) Applicant: Naritake Kondoh, Kanagawa (JP)

(72) Inventor: Naritake Kondoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 178 days.

(21) Appl. No.: 14/011,967

(22) Filed: Aug. 28, 2013

(65) Prior Publication Data

US 2014/0068715 A1    Mar. 6, 2014

(30) Foreign Application Priority Data

Sep. 6, 2012    (JP) .................................. 2012-196063

(51) Int. Cl.
*G06F 21/44* (2013.01)
*G06F 21/60* (2013.01)

(52) U.S. Cl.
CPC .............. *G06F 21/44* (2013.01); *G06F 21/608* (2013.01)

(58) Field of Classification Search
None
See application file for complete search history.

(56) References Cited

U.S. PATENT DOCUMENTS

| | | | | |
|---|---|---|---|---|
| 6,952,780 B2* | 10/2005 | Olsen | .................... | G06F 21/608 380/243 |
| 2006/0077456 A1* | 4/2006 | Aoki | .......................... | 358/1.15 |
| 2006/0136992 A1 | 6/2006 | Shigeeda | | |
| 2008/0239381 A1 | 10/2008 | Oshima | | |
| 2008/0259380 A1* | 10/2008 | Nuggehalli | .................. | 358/1.15 |
| 2010/0097628 A1* | 4/2010 | Masuda | ....................... | 358/1.14 |
| 2010/0231947 A1* | 9/2010 | Kato | ........................... | 358/1.13 |
| 2011/0043845 A1* | 2/2011 | Nakagawa | ......... | H04H 1/00411 358/1.13 |
| 2011/0235114 A1* | 9/2011 | Saitoh | ................ | H04N 1/00233 358/1.15 |
| 2011/0261391 A1* | 10/2011 | Oba | ...................... | G06F 3/1209 358/1.15 |
| 2012/0092708 A1* | 4/2012 | Hayami | ....................... | 358/1.15 |
| 2012/0105908 A1* | 5/2012 | Tsutsumi | ..................... | 358/1.15 |
| 2012/0110098 A1 | 5/2012 | Matsugashita | | |
| 2012/0154849 A1* | 6/2012 | Kurohata | ..................... | 358/1.14 |
| 2013/0242335 A1* | 9/2013 | Naitoh | ................. | G06K 15/405 358/1.14 |
| 2014/0078527 A1* | 3/2014 | Ono | ...................... | G06F 3/1211 358/1.9 |
| 2015/0062617 A1* | 3/2015 | Takagi | ................. | G06K 15/026 358/1.14 |
| 2015/0301772 A1* | 10/2015 | Nakajima | ............. | G06F 3/1285 358/1.15 |

FOREIGN PATENT DOCUMENTS

| | | |
|---|---|---|
| JP | 2001-256010 | 9/2001 |
| JP | 2006-203858 | 8/2006 |
| JP | 2008-243067 | 10/2008 |
| JP | 2008-250972 | 10/2008 |
| JP | 2012-094002 | 5/2012 |

* cited by examiner

*Primary Examiner* — Christopher Revak
(74) *Attorney, Agent, or Firm* — IPUSA, PLLC

(57) ABSTRACT

An information processor is connected via a network to an output apparatus and configured to control a job outputting process of the output apparatus. The information processor includes a job identifier generation part configured to generate a job identifier for uniquely identifying a job input from a terminal apparatus connected via the network to the information processor, an information storage part configured to store information that correlates the job identifier and the input job, a job identifier transmission part configured to transmit the job identifier correlated with the input job to the terminal apparatus, and a job association part configured to associate user information for uniquely identifying an authenticated user received from the output apparatus with the input job based on a job association request including the user information and the job identifier and on the information stored in the information storage part.

13 Claims, 27 Drawing Sheets

FIG.7

| JOB ID | USERNAME | PIN CODE | JOB NAME | INPUT TIME | SIZE | STORAGE LOCATION | PAGE | DUPLEX/SIMPLEX | NUMBER OF COPIES | ... |
|---|---|---|---|---|---|---|---|---|---|---|
| 1 | | 12345678 | REPORT.doc | 2012/5/28 13:03 | 128KB | http://temp.storage.com/1.doc | 1 | DUPLEX | 1 | |
| 2 | user0001 | | CATALOGUE.doc | 2012/5/27 14:03 | 523KB | http://storage.com/2.doc | 1 | DUPLEX | 4 | |
| 3 | | 23456789 | PRESENTATION.doc | 2012/5/25 12:23 | 64KB | http://temp.storage.com/3.doc | 1 | SIMPLEX | 3 | |

| CORPORATE INFORMATION | CORPORATE CODE | DEVICE INFORMATION |
|---|---|---|
| CORPORATION A | XXX | 111 |
| | | 222 |
| | | 333 |
| CORPORATION B | YYY | 444 |

BEFORE REGISTRATION

| JOB ID | CORPORATE CODE | USERNAME | PIN CODE | BIBLIOGRAPHIC INFORMATION (TITLE, ETC.) |
|---|---|---|---|---|
| 1 | XXX | | 12345678 | ⋮ |
| 2 | XXX | user0002 | | ⋮ |
| 3 | | | 23456789 | ⋮ |
| 4 | YYY | user0001 | | ⋮ |

AFTER REGISTRATION

| JOB ID | CORPORATE CODE | USERNAME | PIN CODE | BIBLIOGRAPHIC INFORMATION (TITLE, ETC.) |
|---|---|---|---|---|
| 1 | XXX | user0001 | 12345678 | ⋮ |
| 2 | XXX | user0002 | | ⋮ |
| 3 | | | 23456789 | ⋮ |
| 4 | YYY | user0001 | | ⋮ |

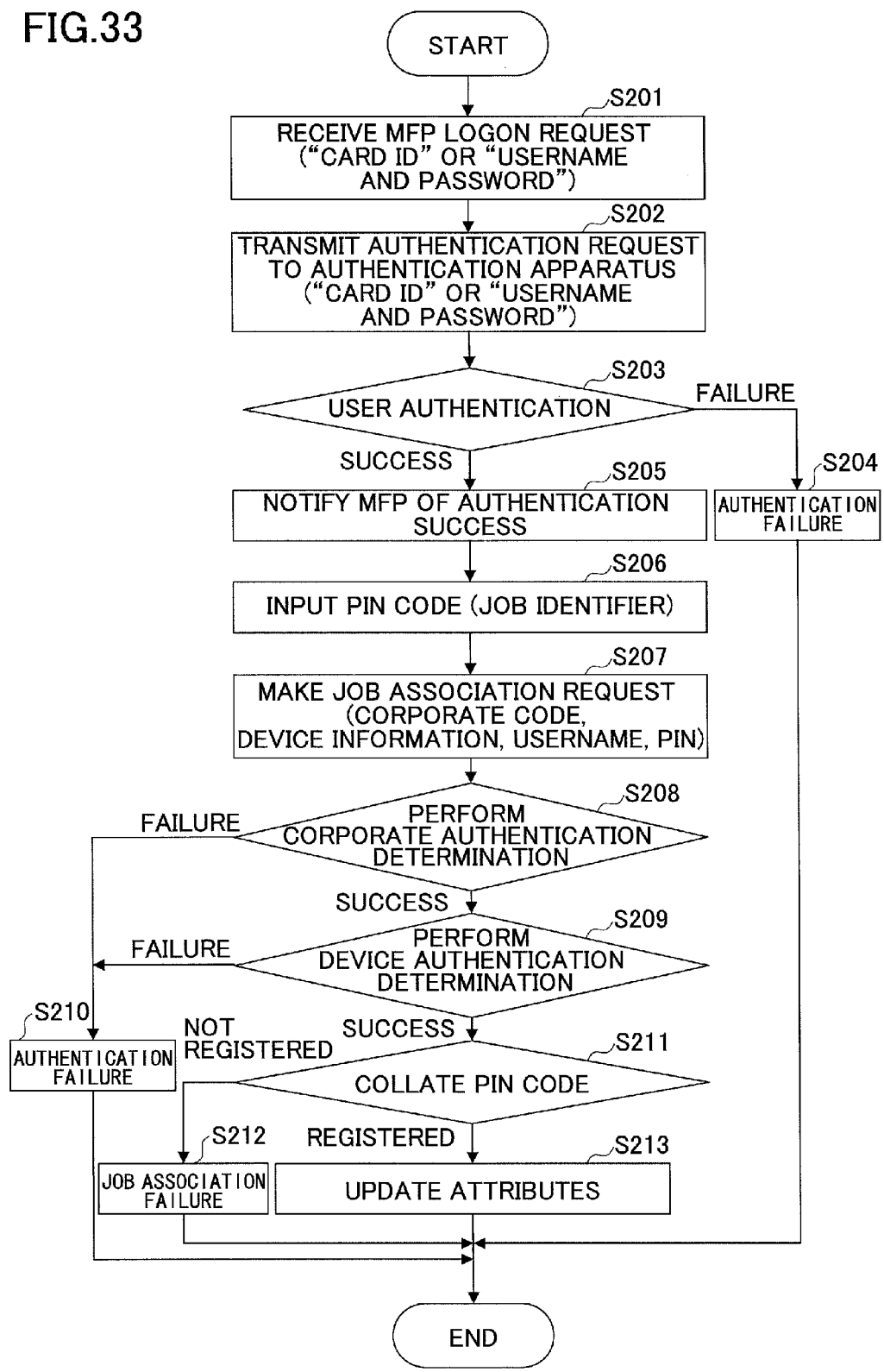

INFORMATION PROCESSOR AND SYSTEM THAT ASSOCIATE JOB AND USER INFORMATION BASED ON JOB IDENTIFIER

CROSS-REFERENCE TO RELATED APPLICATION

The present application is based upon and claims the benefit of priority of Japanese Patent Application No. 2012-196063, filed on Sep. 6, 2012, the entire contents of which are incorporated herein by reference.

BACKGROUND OF THE INVENTION

1. Field of the Invention

The present invention relates to information processors, systems, and recording media.

2. Description of the Related Art

There has been a known technique of securely outputting information in response to an information output request from a mobile environment such as a portable information terminal, using an output apparatus located closest to the requestor, in a network information output system that processes an information output request issued from an entity whose logical and physical locations vary, such as a portable information terminal. (For example, see Japanese Laid-Open Patent Application No. 2001-256010.)

SUMMARY OF THE INVENTION

According to an aspect of the present invention, an information processor is connected via a network to an output apparatus and is configured to control a job outputting process of the output apparatus. The information processor includes a job identifier generation part configured to generate a job identifier for uniquely identifying a job input from a terminal apparatus connected via the network to the information processor, an information storage part configured to store information that correlates the job identifier and the input job, a job identifier transmission part configured to transmit the job identifier correlated with the input job to the terminal apparatus, and a job association part configured to associate user information for uniquely identifying an authenticated user received from the output apparatus with the input job based on a job association request including the user information and the job identifier and on the information stored in the information storage part.

According to an aspect of the present invention, a system includes an output apparatus and an information processor connected via a network to the output apparatus and configured to control a job outputting process of the output apparatus. The information processor includes a job identifier generation part configured to generate a job identifier for uniquely identifying a job input from a terminal apparatus connected via the network to the information processor, an information storage part configured to store information that correlates the job identifier and the input job, a job identifier transmission part configured to transmit the job identifier correlated with the input job to the terminal apparatus, and a job association part configured to associate user information for uniquely identifying an authenticated user received from the output apparatus with the input job based on a job association request including the user information and the job identifier and on the information stored in the information storage part. The output apparatus includes an authentication part configured to authenticate the user, and a job association request part configured to make the job association request to the information processor using the user information and the job identifier.

According to an aspect of the present invention, a non-transitory computer-readable recording medium has a program recorded thereon, wherein the program instructs a computer processor to implement an information processor connected via a network to an output apparatus and configured to control a job outputting process of the output apparatus. The information processor includes a job identifier generation part configured to generate a job identifier for uniquely identifying a job input from a terminal apparatus connected via the network to the information processor, an information storage part configured to store information that correlates the job identifier and the input job, a job identifier transmission part configured to transmit the job identifier correlated with the input job to the terminal apparatus, and a job association part configured to associate user information for uniquely identifying an authenticated user received from the output apparatus with the input job based on a job association request including the user information and the job identifier and on the information stored in the information storage part.

The object and advantages of the invention will be realized and attained by means of the elements and combinations particularly pointed out in the claims.

It is to be understood that both the foregoing general description and the following detailed description are exemplary and explanatory and not restrictive of the invention.

BRIEF DESCRIPTION OF THE DRAWINGS

Other objects, features and advantages of the present invention will become more apparent from the following detailed description when read in conjunction with the accompanying drawings, in which:

FIG. 7 is a diagram illustrating a configuration of a table in which an attribute storage part stores attribute information according to the first embodiment;

FIG. 33 is a flowchart of a job association process of a printing system according to the fourth embodiment.

DETAILED DESCRIPTION OF THE PREFERRED EMBODIMENTS

For example, there is a system where a print job received from a terminal apparatus such as a personal computer (PC) is stored in a print server or the like on a public network such as the Internet instead of being immediately subjected to printing, and where a print job selected by a user from a list of stored print jobs is printed with an image forming apparatus such as a multifunction machine after the user logs on. In such a system, in light of information security, user authentication is commonly executed when a print job stored in the print server is printed with the image forming apparatus. Authentication information including a user ID and a password is used for user authentication.

In the case where user authentication is managed in an authentication server or the like on a private network such as a corporate network (a network inside a corporation), it is desired to use (link up with) the user authentication management executed on the private network in a print server or the like on a public network as well.

Making a copy of the authentication information of user authentication management executed on a private network and using the copy on a public network such as the Internet, however, takes time and effort and is not preferable in terms of security. On the other hand, in the case of making no copy of the authentication information of user authentication management executed on a private network, there is a problem in that the function of inputting a print job from a public network such as the Internet to a print server or the like is restricted, thus impairing convenience.

According to an aspect of the present invention, an information processor and a system are provided that may use user authentication management executed on a private network without impairing convenience, and a recording medium having a program recorded thereon is provided, where the program causes a computer processor to implement the information processor.

Next, a description is given of embodiments of the present invention.

First Embodiment

Figure 1:
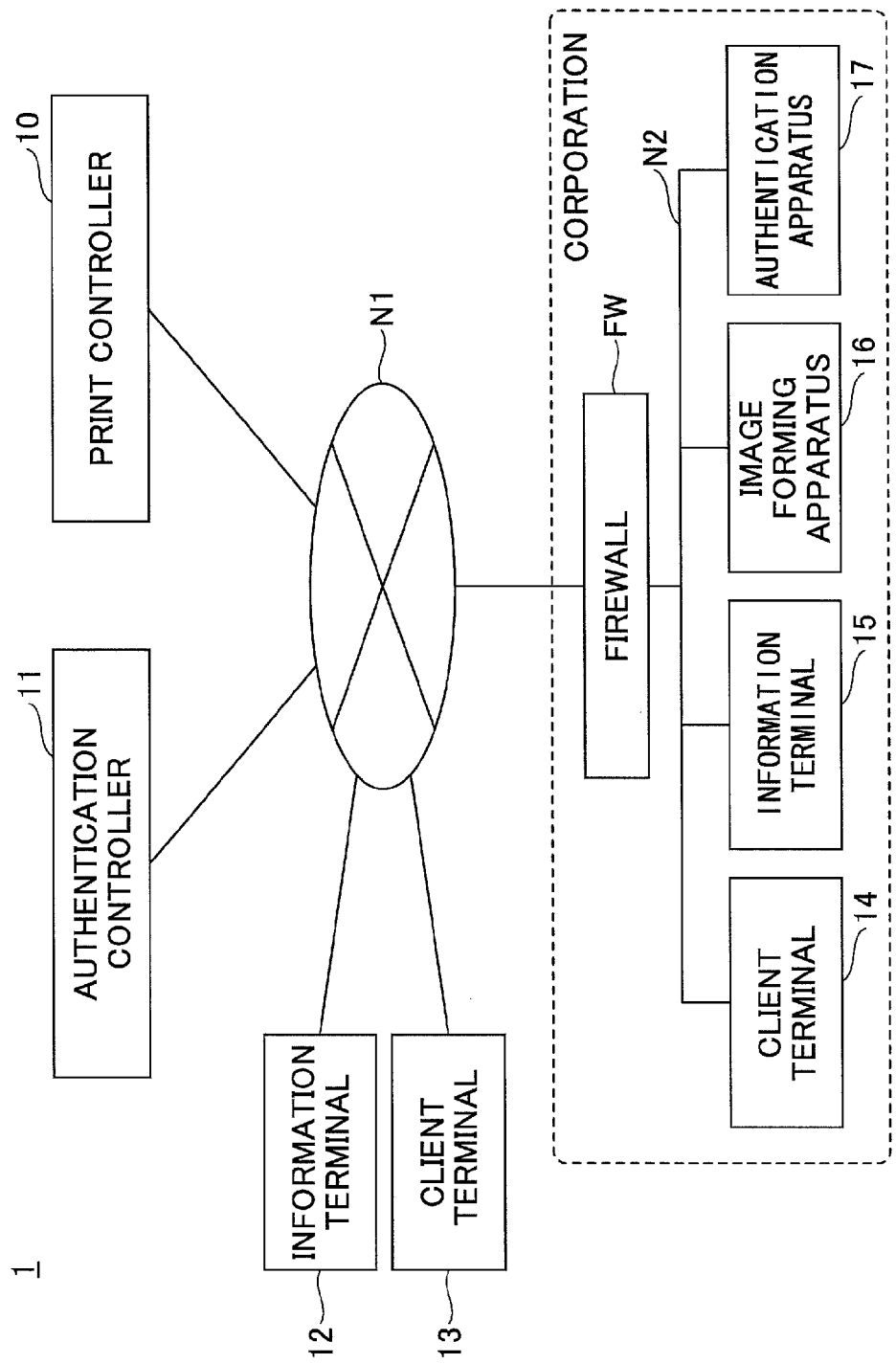
FIG. 1 is a diagram illustrating a configuration of a printing system according to a first embodiment.

FIG. 1 is a diagram illustrating a configuration of a printing system according to a first embodiment. Referring to FIG. 1, a printing system 1 includes a public network N1 such as the Internet and a private network N2 such as a corporate network. The network N1 and the network N2 are connected through a firewall FW on the network N2 side. The firewall FW is installed at the connection of the network N1 and the network N2 and relays access from the network N2 to the network N1.

The network N1 is used by an unspecified number of users. Access from the network N1 to the network N2 side is restricted. A print controller 10, an authentication controller 11, an information terminal 12, and a client terminal 13 are connected to the network N1.

The print controller 10, which is an output controller, is, for example, a print server or the like. The print controller 10 is implemented by one or more information processors (computer systems). The print controller 10 may be implemented by a common server operating system (OS) such as Linux (registered trademark) or Windows (registered trademark).

The print controller 10 uses protocols such as the Hypertext Transfer Protocol (HTTP) and the Hypertext Transfer Protocol Secure (HTTPS). The print controller 10 receives print jobs input from the information terminal 12, the client terminal 13, a client terminal 14, and an information terminal 15. Furthermore, as described below, the print controller 10 receives a job association request from an image forming apparatus 16 and associates an input print job with a user. Furthermore, the print controller 10 receives a print job obtaining request from the image forming apparatus 16 and provides the image forming apparatus 16 with a requested print job. The print controller 10 may link up with an authentication apparatus 17 through the Security Assertion Markup Language (SAML).

The authentication controller 11 establishes a trust relationship with the authentication apparatus 17 and controls (determines) whether to authorize a user to use the print controller 10 based on the result of authentication by the authentication apparatus 17. The authentication controller 11 is implemented by one or more information processors (computer systems).

The information terminal 12 is a terminal apparatus. The information terminal 12 is connectable to the network N1. The information terminal 12 includes a radio communications part that performs radio communications or a wired communication part that performs wired communications. The information terminal 12 is a portable terminal that may be carried around by a user, such as a smartphone, a cellular phone, a tablet PC, or a notebook PC. The information terminal 12 may input a print job to the print controller 10 using a dedicated application, by uploading the print job using a Web UI, or by transmitting the print job using electronic mail.

The client terminal 13 is a terminal apparatus. The client terminal 13 may be implemented by an information processor (computer system) that includes a common OS such as Windows (registered trademark). The client terminal 13 is connectable to the network N1. The client terminal 13 includes a radio communications part that performs radio communications or a wired communication part that performs wired communications.

The client terminal 13 is a portable terminal that may be carried around by a user, such as a smartphone, a cellular phone, a tablet PC, or a notebook PC. The client terminal 13 may input a print job to the print controller 10 using a dedicated printer driver (port monitor), by uploading the print job using a Web UI, or by transmitting the print job using electronic mail.

The network N2 is a private network that exists inside the firewall FW. The network N2 is an environment to which access from the network N1 is restricted. The client terminal 14, the information terminal 15, the image forming apparatus 16, and the authentication apparatus 17 are connected to the network N2.

The client terminal 14 is the same as the client terminal 13. That is, the client terminals 13 and 14 may be provided on either the private network N2 or the public network N1. The information terminal 15 is the same as the information terminal 12. That is, the information terminals 12 and 15 may be provided on either the private network N2 or the public network N1.

The image forming apparatus 16 is an apparatus having a printing function, such as a printer or a multifunction machine (for example, a multifunction peripheral [MFP]). The image forming apparatus 16 includes a radio communications part that performs radio communications or a wired communication part that performs wired communications. As described below, the image forming apparatus 16 causes the print controller 10 to associate an input print job and a user with each other by making a job association request to the print controller 10. Furthermore, the image forming apparatus 16 makes a request to obtain a print job (a print job obtaining request) to the print controller 10 and executes a print job received from the print controller 10. The image forming apparatus 16 may link up with an authentication service inside or outside the image forming apparatus 16.

The authentication apparatus 17 is, for example, an authentication server or the like. The authentication server 17 may be implemented by a common server operating system (OS) such as Linux (registered trademark) or Windows (registered trademark). The authentication apparatus 17 may be a server that includes, for example, a Lightweight Directory Access Protocol (LDAP) or Active Directory product or be an application server that operates in cooperation with the product. Furthermore, there may be a federation server in the case of using SAML. The authentication server 17 may be inside the image forming apparatus 16.

A user inputs a print job to the print controller 10 from the information terminal 12 or the client terminal 13 of the public network N1. At this point, the information terminal 12 or the client terminal 13 from which the print job has been input obtains a job identifier associated with the print job from the print controller 10. The job identifier may be implemented by, for example, a PIN code. After inputting the print job, the user logs on to the image forming apparatus 16 and thereafter inputs the job identifier obtained at the time of inputting the print job to the image forming apparatus 16. The image forming apparatus 16 may cause the print controller 10 to associate the input print job and user information with each other by making a job association request including the user information and the job identifier to the print controller 10.

Then, after logging on to the image forming apparatus 16, the user gives an instruction to display a list of print jobs. The image forming apparatus 16 obtains a list of print jobs including the print job input from the information terminal 12 or the client terminal 13 of the public network N1 from the print controller 10, and displays the obtained list of print jobs. The user selects a print job that the user wishes to print from the list of print jobs, and gives a print instruction to print the selected print job. The image forming apparatus 16 obtains, from the print controller 10, the print job for which the print instruction has been received, and executes printing (prints the obtained print job).

The print controller 10 and the authentication controller 11 of the printing system 1 of FIG. 1 may be implemented by being integrated into a single computer. Alternatively, the print controller 10 and the authentication controller 11 may be implemented by being distributed between multiple computers.

Figure 2:
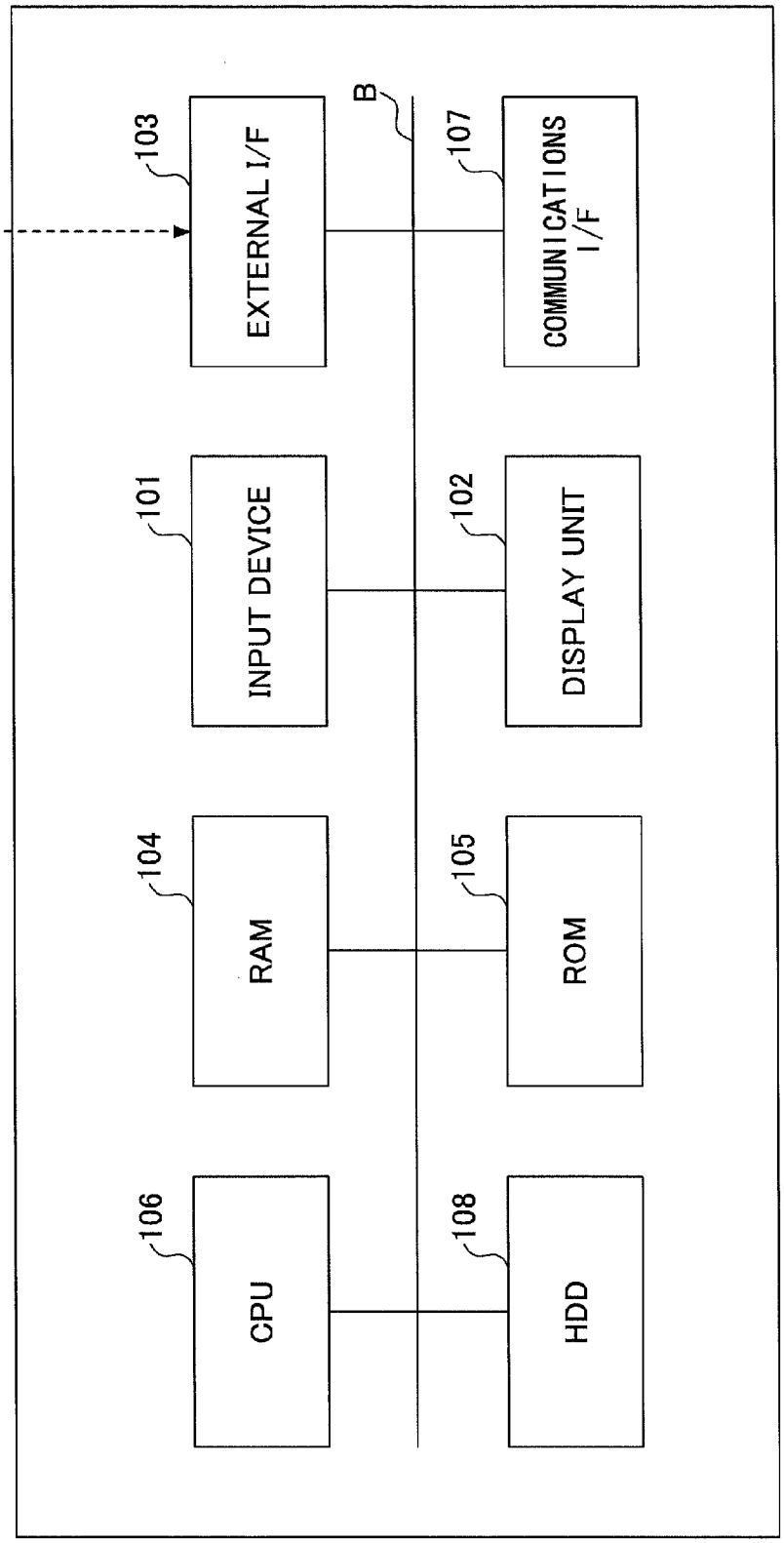
FIG. 2 is a diagram illustrating a hardware configuration of a computer system according to the first embodiment.

The print controller 10, the authentication controller 11, the information terminals 12 and 15, the client terminals 13 and 14, and the authentication apparatus 17 are implemented by, for example, a computer system that has a hardware configuration illustrated in FIG. 2. FIG. 2 is a diagram illustrating a hardware configuration of a computer system according to this embodiment.

A computer system 100 illustrated in FIG. 2 includes an input device 101, a display unit 102, an external interface (I/F) 103, a random access memory (RAM) 104, a read-only memory (ROM) 105, a central processing unit (CPU) 106, a communications I/F 107, and a hard disk drive (HDD) 108, all of which are interconnected by a bus B.

The input device 101, which includes a keyboard and a mouse, is used for a user to input operation signals. The display unit 102, which includes a display, displays the results of processing by the computer system 100.

The communications I/F 107 is an interface that connects the computer system 100 to the network N1 or N2. It is possible for the computer system 100 to perform data communications through the communications I/F 107.

The HDD 108 is a nonvolatile storage device that stores programs and data. Examples of the stored programs and data include an operating system (OS), which is basic software that performs overall control of the computer system 100 and application software that provides various kinds of functions on the OS. The HDD 108 manages the stored programs and data using a predetermined file system and/or database (DB).

The external I/F 103 is an interface with external apparatuses. Examples of external apparatuses include a recording medium 103a. It is possible for the computer system 100 to read and/or write to the recording medium 103a through the external I/F 103. Examples of the recording medium 103a includes flexible disks, compact disk (CD)s, digital versatile disk (DVD)s, SD memory cards, and universal serial bus (USB) memories.

The ROM 105 is a nonvolatile semiconductor memory (storage device) capable of retaining stored programs or data even when power is turned off. The ROM 105 contains programs and data of the basic input/output system (BIOS), an OS configuration, and a network configuration, which are executed at the time of starting the computer system 100. The RAM 104 is a volatile semiconductor memory (storage device) that temporarily retains programs and data.

The CPU 106 is a processor that implements overall control and functions of the computer system 100 by reading programs and data from storage devices such as the ROM 105 and the HDD 108 into the RAM 104 and executing processes.

The print controller 10, the authentication controller 11, the information terminals 12 and 15, the client terminals 13 and 14, and the authentication apparatus 17 according to this embodiment may implement various kinds of processes described below, based on the above-described hardware configuration of the computer system 100.

Figure 3:
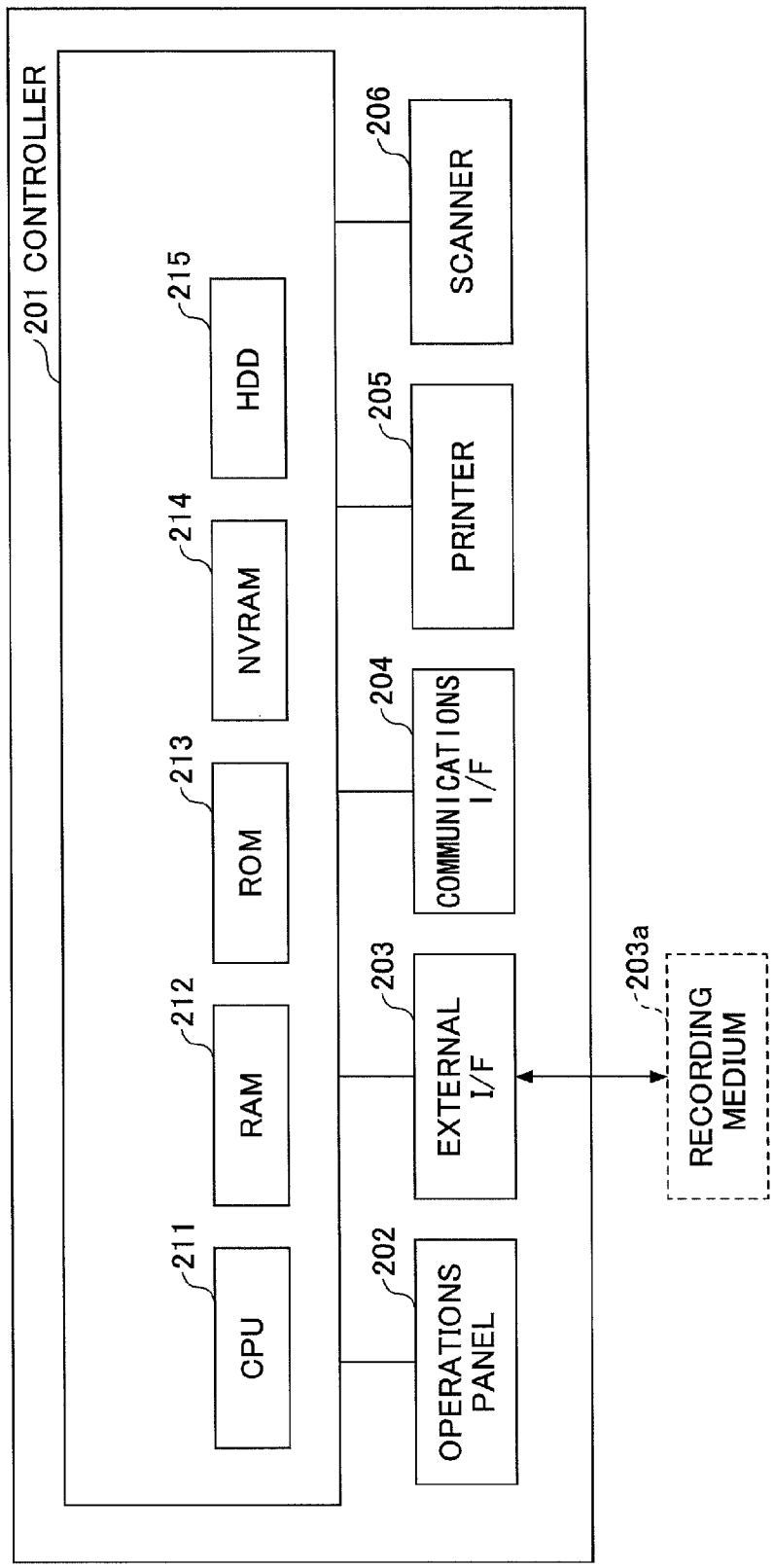
FIG. 3 is a diagram illustrating a hardware configuration of an image forming apparatus according to the first embodiment.

FIG. 3 is a diagram illustrating a hardware configuration of an image forming apparatus according to this embodiment. Referring to FIG. 3, the image forming apparatus 16 includes a controller 201, an operations panel 202, an external I/F 203, a communications I/F 204, a printer 205, and a scanner 206.

The controller 201 includes a CPU 211, a RAM 212, a ROM 213, a nonvolatile RAM (NVRAM) 214, and an HDD 215. The ROM 213 contains various kinds of programs and data. The RAM 212 temporarily retains programs and data. The NVRAM 214 contains, for example, configuration information. The HDD 215 contains various kinds of programs and data.

The CPU 211 implements overall control and functions of the image forming apparatus 16 by reading programs, data, configuration information, etc., from the ROM 213, the NVRAM 214, and the HDD 215 into the RAM 212 and executing processes.

The operations panel 202 includes an input part that receives a user's input and a display part that performs displaying. The external I/F 203 is an interface with external apparatuses. Examples of external apparatuses include a recording medium 203a. It is possible for the image forming apparatus 16 to read and/or write to the recording medium 203a through the external I/F 203. Examples of the recording medium 203a include IC cards, flexible disks, CDs, DVDs, SD memory cards, and USE memories.

The communications I/F 204 is an interface that connects the image forming apparatus 16 to the network N2. It is possible for the image forming apparatus 16 to perform data communications through the communications I/F 204.

The printer 205 is a printing unit that prints print data on a recording medium such as paper. The scanner 206 is a reading unit that reads image data from an original material such as a document. The image forming apparatus 16 according to this embodiment may implement various kinds of processes described below, based on the above-described hardware configuration.

A description is given of software configurations according to this embodiment.

Figure 4:
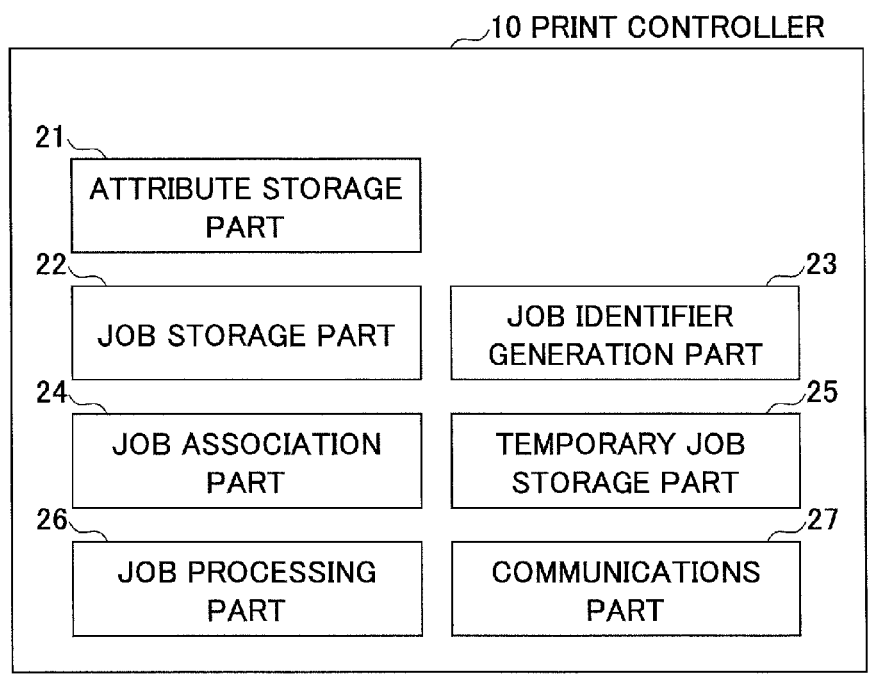
FIG. 4 is a diagram illustrating process blocks of a print controller according to the first embodiment.

The print controller 10 according to this embodiment is implemented by, for example, process blocks illustrated in FIG. 4. FIG. 4 is a diagram illustrating process blocks of a print controller according to this embodiment.

The print controller 10 implements an attribute storage part 21, a job storage part 22, a job identifier generation part 23, a job association part 24, a temporary job storage part 25, a job processing part 26, and a communications part 27 by executing a program.

The attribute storage part 21 stores below-described attribute information. The job storage part 22 stores a print job associated with a user (that is, a print job whose user is determined). The job identifier generation part 23 generates a job identifier. The job association part 24 associates a user who has logged on with a job identifier.

The temporary job storage part 25 stores a print job not associated with a user (that is, a print job whose user is not determined) and a job identifier in association with each other. The job processing part 26 performs processing related to a print job. The communications part 27 performs communications with the information terminal 12, the client terminal 13, the image forming apparatus 16, etc.

Figure 5:
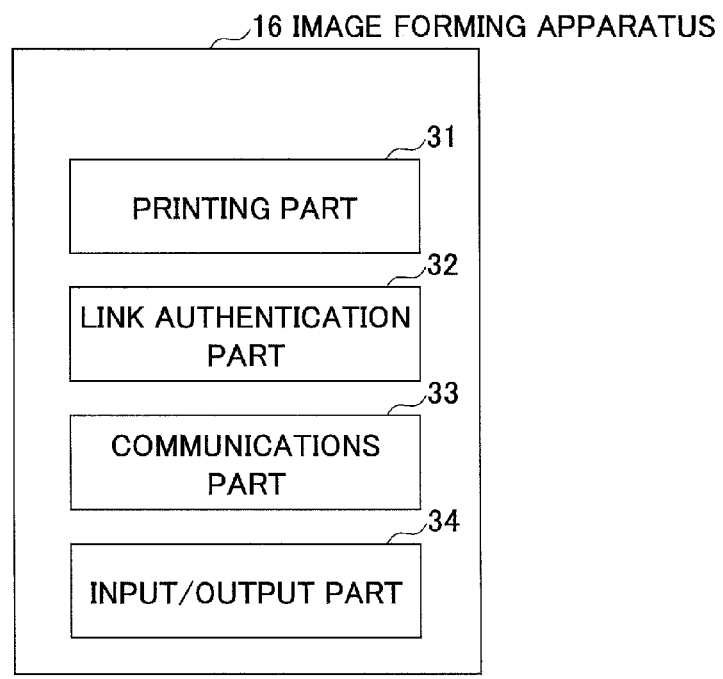
FIG. 5 is a diagram illustrating process blocks of an image forming apparatus according to the first embodiment.

The image forming apparatus 16 according to this embodiment is implemented by, for example, process blocks illustrated in FIG. 5. FIG. 5 is a diagram illustrating process blocks of an image forming apparatus according to this embodiment. The image forming apparatus 16 implements a printing part 31, a link authentication part 32, a communications part 33, and an input/output part 34 by executing a program.

The printing part 31 performs printing. The link authentication part 32 logs on to the print controller 10 side based on authentication on the private network N2 and its authentication information (such as user information). The communications part 33 performs communications with the print controller 10, the information terminal 12, the client terminal 13, etc. The input/output part 34 receives a user's input and displays information to a user.

The above-described process blocks may also be implemented by a function incorporated into the image forming apparatus 16, a function using an advanced Application Programming Interface (API) of the image forming apparatus 16, or a function of an external terminal attached to the image forming apparatus 16.

Figure 6:
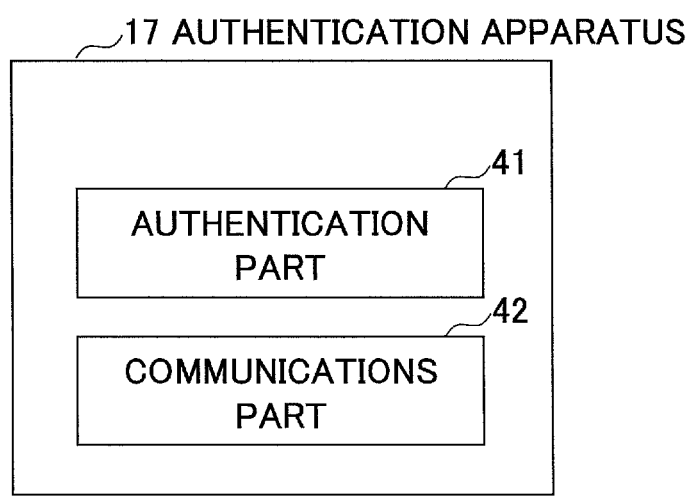
FIG. 6 is a diagram illustrating process blocks of an authentication apparatus according to the first embodiment.

The authentication apparatus 17 according to this embodiment is implemented by, for example, process blocks illustrated in FIG. 6. FIG. 6 is a diagram illustrating process blocks of an authentication apparatus according to this embodiment. The authentication apparatus 17 implements an authentication part 41 and a communications part 42 by executing a program. The authentication part 41 performs requested authentication based on authentication information. The communications part 42 performs communications with the client terminal 14, the information terminal 15, the image forming apparatus 16, etc.

FIG. 7 is a diagram illustrating a configuration of a table in which an attribute storage part stores attribute information (an attribute information storage table) according to this embodiment. The attribute information storage table of FIG. 7 includes data items such as Job ID, Username, PIN Code, Job Name, Input Time, Size, Storage Location, Page, Duplex/Simplex, and Number of Copies.

Job ID is information for uniquely identifying a print job. Username is information for identifying a user associated with a print job. PIN Code is information for uniquely identifying a print job associated with no user. Job Name is information for making it easy for a user to identify an input print job. Input Time is information that represents the date and time of the inputting of a print job. Size is the size of a print job. Storage Location is information that represents a location where a print job is stored. Page, Duplex/Simplex, and Number of Copies represent examples of print settings.

For example, referring to FIG. 7, information is set in PIN Code but no information is set in Username in the records of Job ID "1" and Job ID "3" because these records are examples of a print job that is not associated with a user (a print job whose user is not determined).

On the other hand, information is set in Username but no information is set in PIN Code in the record of Job ID "2" because this record is an example of a print job associated with a user (a print job whose user is determined). The record of Job ID "2" may keep the information set in PIN Code.

In the above description of the printing system 1 of this embodiment, by way of example, a case is illustrated where the attribute storage part 21 of the print controller 10 stores attribute information. Alternatively, however, a relational database management system (RDBMS) or the like may be used to store attribute information.

A description is given in more detail below of processes executed by the printing system 1 according to this embodiment.

Figure 8:
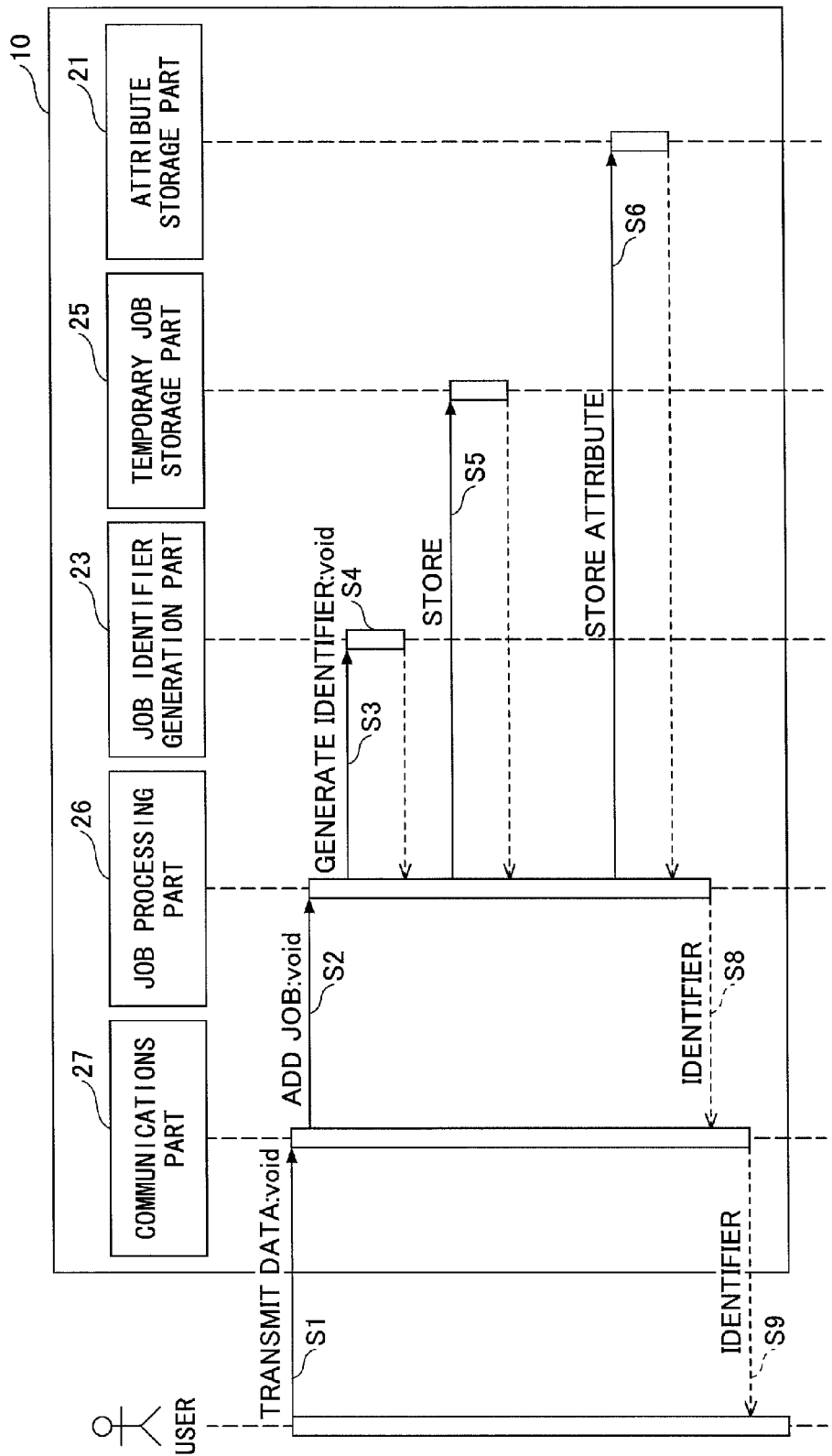
FIG. 8 is a sequence diagram of a job inputting process of a printing system according to the first embodiment.

FIG. 8 is a sequence diagram of a job inputting process of a printing system according to this embodiment. Referring to FIG. 8, at step S1, a user transmits a print job to the print controller 10 by operating the information terminal 12, the client terminal 13 or the like. The transmission of a print job from the information terminal 12, the client terminal 13 or the like to the print controller 10 may be performed by uploading the print job using a Web UI, transmitting the print job using electronic mail, transmitting the print job using a dedicated application, transmitting the print job by linking up with a Web service, or transmitting the print job using a dedicated printer driver (port monitor).

At step S2, the communications part 27 of the print controller 10 requests the job processing part 26 to add the received print job. At step S3, the job processing part 26 requests the job identifier generation part 23 to generate a job identifier. At step S4, the job identifier generation part 23 generates a job identifier and returns the generated job identifier to the job processing part 26.

At step S5, the job processing part 26 causes the temporary job storage part 25 to store the received print job and the job identifier generated by the job identifier generation part 23 in association (correlation) with each other. At step S6, the job processing part 26 causes the attribute information of the print job including the job identifier generated by the job identifier generation part 23 to be stored in the table of the attribute storage part 21 as illustrated in FIG. 7, for example.

Then, at step S8 and step S9, the job processing part 26 returns the job identifier generated by the job identifier generation part 23 to the information terminal 12, the client terminal 13 or the like operated by the user through the communications part 27, so that the user may be notified of the job identifier. The print job may be to print an application file. In the case of the application file, the print controller 10 may perform rendering on a print job stored in the temporary job storage part 25 or perform rendering on a print job after the print job is transferred to the job storage part 22.

Figure 9:
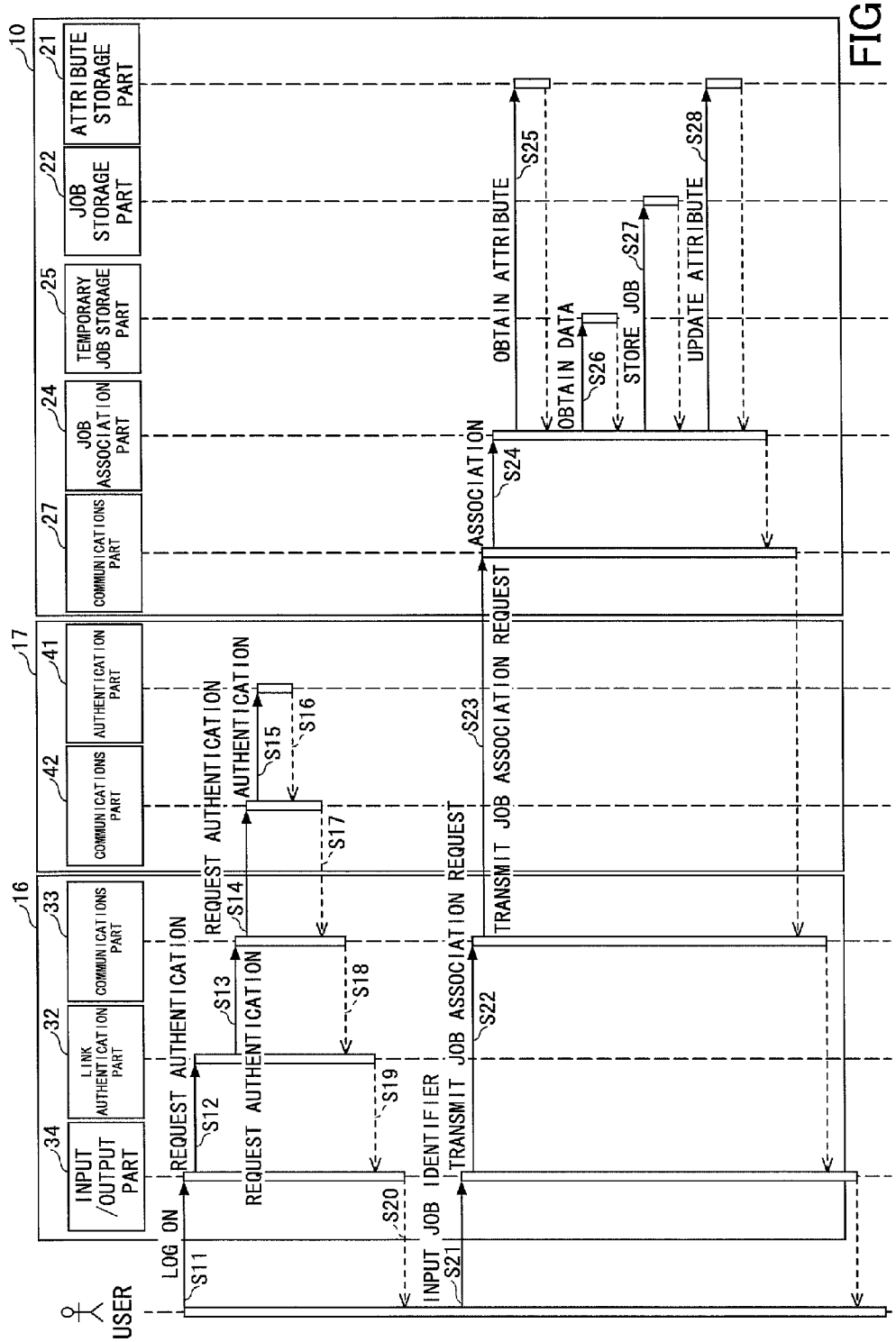
FIG. 9 is a sequence diagram illustrating a job association process of a printing system according to the first embodiment.

FIG. 9 is a sequence diagram illustrating a job association process of a printing system according to this embodiment. Referring to FIG. 9, at step S11, a user operates the image forming apparatus 16 to input, for example, a username and a password as authentication information for the authentication apparatus 17 of the private network N2, and makes a request to log on to the image forming apparatus 16. The input/output part 34 of the image forming apparatus 16 receives the authentication information input by the user.

At step S12, the input/output part 34 transmits the received authentication information to the link authentication part 32 and requests authentication. At step S13 and step S14, the link authentication part 32 transmits the authentication information to the authentication apparatus 17 through the communications part 33, and requests authentication.

At step S15, the communications part 42 of the authentication apparatus 17 transmits the received authentication information to the authentication part 41 and requests authentication. If authentication succeeds with the received authentication information, at step S16, the authentication part 41 returns the authentication result of authentication success to the communications part 42. If authentication fails with the received authentication information, at step S16, the authentication part 41 returns the authentication result of authentication failure to the communications part 42. The authentication result may be a ticket or the like.

Then, at step S17, step S18, step S19 and step S20, the authentication result is returned from the authentication apparatus 17 to the user operating the image forming apparatus 16. If the authentication result is authentication success, at step S21, the user operates the image forming apparatus 16 to input the job identifier reported to the user at the time of inputting the print job (FIG. 8) and makes a job association request. The input/output part 34 of the image forming apparatus 16 receives the job identifier input by the user.

At step S22 and step S23, the input/output part 34 transmits the job identifier received from the user and user information (such as a username) of the successful authentication result to the print controller 10 through the communications part 33, and makes a job association request.

At step S24, the communications part 27 of the print controller 10 transmits the received job identifier and username to the job association part 24 and requests job association. At step S25, the job association part 24 obtains a record corresponding to a PIN code, which is an example of the job identifier, from the table of the attribute storage part 21 as illustrated in FIG. 7.

At step S26, the job association part 24 obtains a print job corresponding to the job identifier from the temporary job storage part 25. At step S27, the job association part 24 stores the obtained print job corresponding to the job identifier in the job storage part 22.

At step S28, the job association part 24 sets information (username) in Username of the record corresponding to the PIN code, which is an example of the job identifier, in the table of the attribute storage part 21 illustrated in FIG. 7. Furthermore, the job association part 24 deletes the PIN code from the record and updates Storage Location of the record from the temporary job storage part 25 to the job storage part 22.

Figure 10:
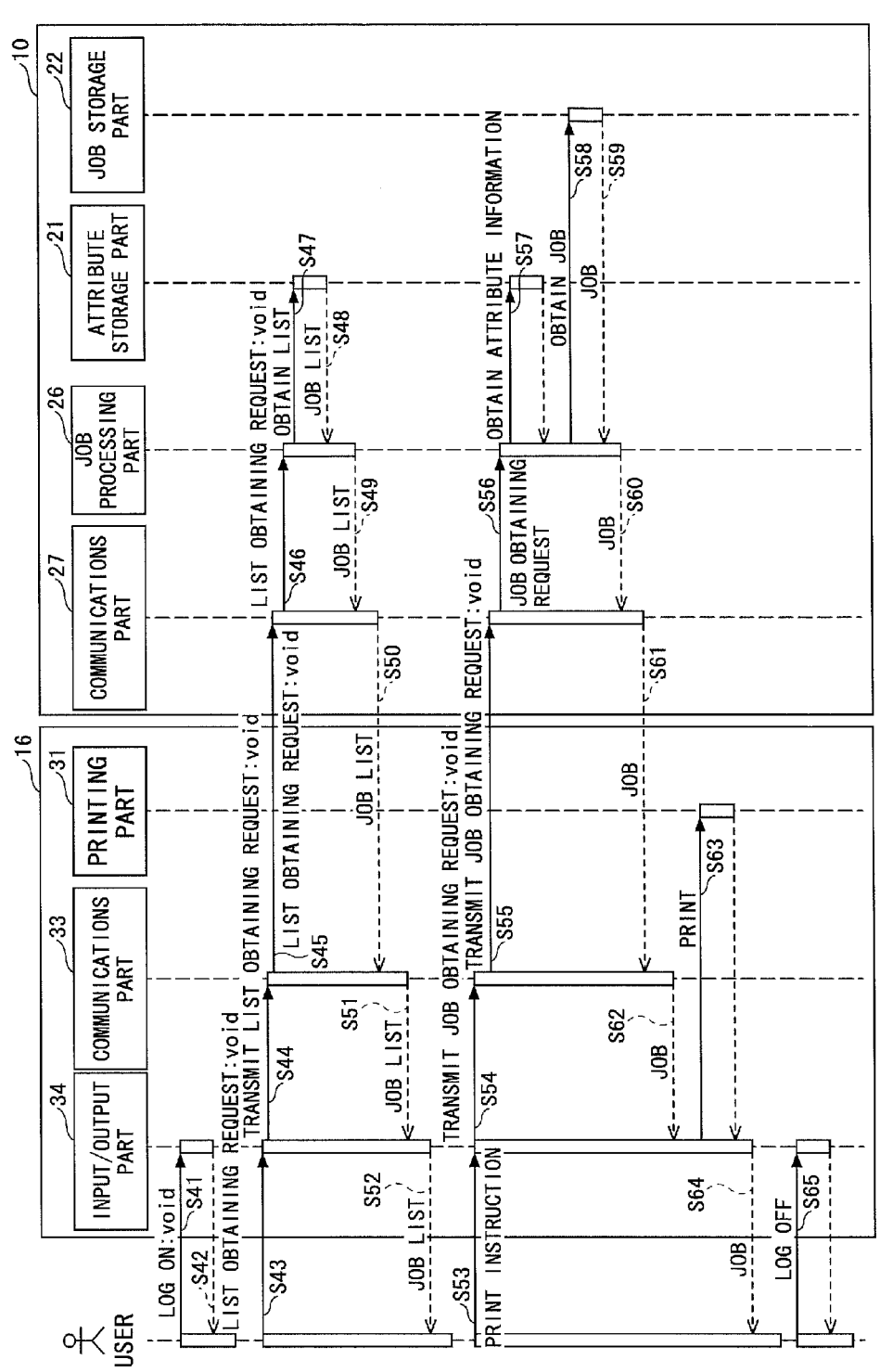
FIG. 10 is a sequence diagram illustrating a job execution process of a printing system according to the first embodiment.

FIG. 10 is a sequence diagram illustrating a job execution process of a printing system according to this embodiment. At step S41 and step S42, a user logs on to the image forming apparatus 16 in the same manner as at step S11 through step S20 of FIG. 9.

Proceeding to step S43, the user operates the image forming apparatus 16 to make a request to obtain a list of jobs (a job list obtaining request). The input/output part 34 of the image forming apparatus 16 receives the job list obtaining request from the user. At step S44 and step S45, the input/output part 34 transmits the username of the logon user (the user who has logged on) to the print controller 10 through the communications part 33, and makes a job list obtaining request.

At step S46, the communications part 27 of the print controller 10 transmits the username received from the image forming apparatus 16 to the job processing part 26 and makes a job list obtaining request. At step S47 and step S48, the job processing part 26 obtains a list of print jobs that match the username of the logon user from the attribute storage part 21. At step S46, step S50, step S51 and step S52, the job list of the logon user is returned from the print controller 10 to the user operating the image forming apparatus 16.

At step S53, the user operates the image forming apparatus 16 to select a print job that the user wishes to print from the job list, and gives an instruction to print the selected print job (a print instruction). The input/output part 34 of the image forming apparatus 16 receives the instruction to print the selected print job from the user.

At step S54 and step S55, the input/output part 34 transmits the username of the logon user and the job ID of the print job for which the print instruction has been received to the print controller 10 through the communications part 33, and makes a request to obtain the print job (a print job obtaining request). At step S56, the communications part 27 of the print controller 10 transmits the username and job ID received from the image forming apparatus 16 to the job processing part 26, and makes a print job obtaining request. At step S57, the job processing part 26 obtains the attribute information of a print job that matches the username and the job ID from the attribute storage part 21.

At step S58 and step S59, the job processing part 26 obtains the print job from the job storage part 22 based on the obtained attribute information of the print job. Then, at step S60, step S61 and step S62, the print job for which the print instruction has been received from the logon user is returned from the print controller 10 to the input/output part 34 of the image forming apparatus 16.

At step S63, the input/output part 34 transmits the received print job to the printing part 31 and causes the printing part 31 to execute printing (print the print job). Furthermore, at step S64, the print job for which the print instruction has been received from the logon user is returned to the user operating the image forming apparatus 16. At step S65, the user operates the image forming apparatus 16 to log off.

Next, a description is given of screen images according to this embodiment.

Figure 11:
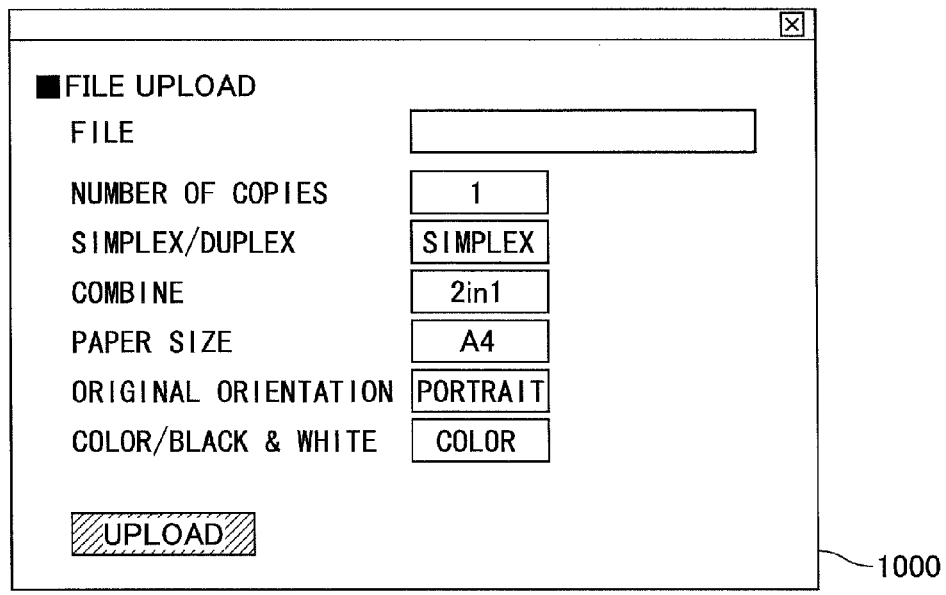
FIG. 11 is a diagram illustrating an image of a screen for uploading a print job according to the first embodiment.

FIG. 11 is a diagram illustrating an image of a screen for uploading a print job (a print job uploading screen). A screen 1000 of FIG. 11 is displayed on the information terminal 12, the client terminal 13 or the like operated by a user at step S1 of FIG. 8. It is possible for a user to upload (transmit) a print job to the print controller 10 from the screen 1000. A print job may also be uploaded to the print controller 10 using a Web UI or electronic mail in place of the screen 1000.

Figure 12:
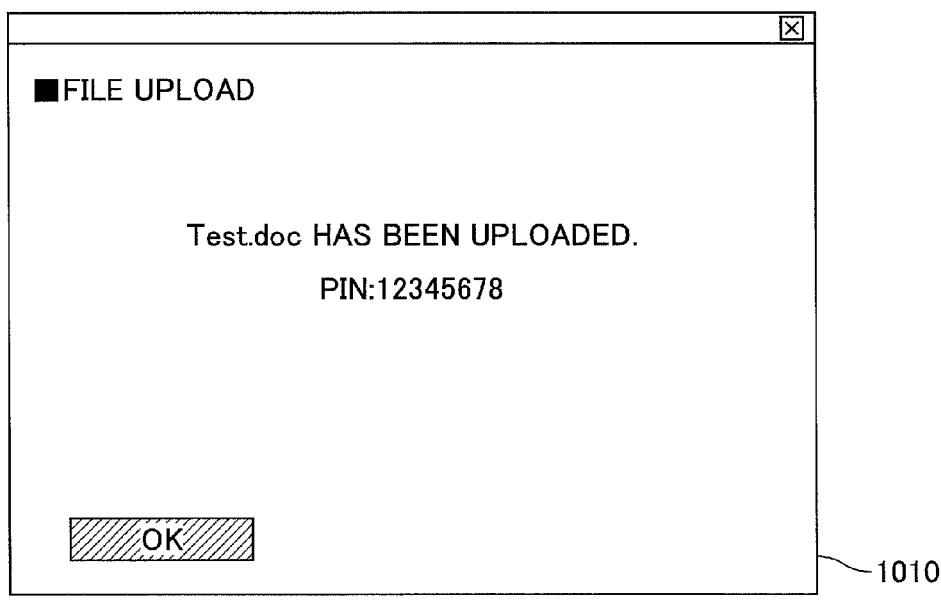
FIG. 12 is a diagram illustrating an image of a screen that reports the completion of the uploading of a print job according to the first embodiment.

FIG. 12 is a diagram illustrating an image of a screen that reports the completion of the uploading of a print job. A screen 1010 of FIG. 12 is displayed on the information terminal 12, the client terminal 13 or the like operated by a user after step S9 of FIG. 8. The screen 1010 includes a PIN code, which is an example of the job identifier returned from the print controller 10 at step S9. The user may obtain the job identifier associated with the uploaded print job by viewing the screen 1010.

Figure 13:
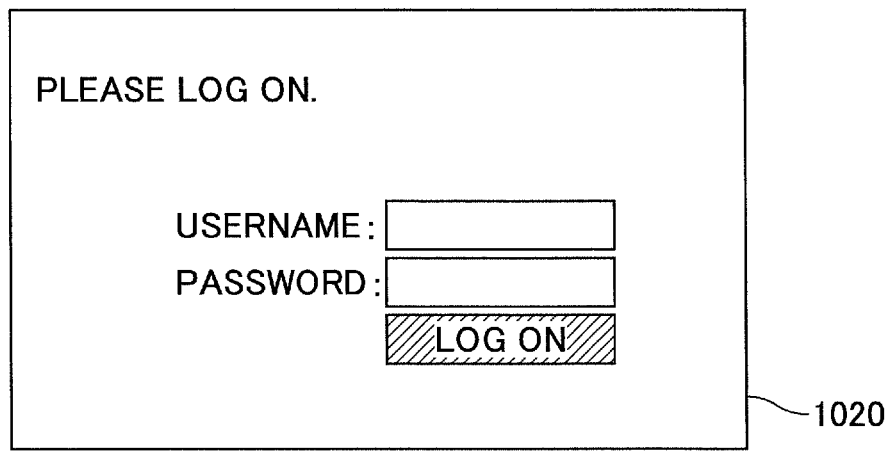
FIG. 13 is a diagram illustrating an image of a screen for logging on to an image forming apparatus according to the first embodiment.

FIG. 13 is a diagram illustrating an image of a screen for logging on to an image forming apparatus. A screen 1020 of FIG. 13 is displayed on the operations panel 202 (FIG. 3) of the image forming apparatus 16 operated by a user at step S11 of FIG. 9 and step S41 of FIG. 10.

A username, a password, etc., may be entered on the screen 1020 as authentication information. A user may enter, for example, a username, a password, etc., as authentication information for the authentication apparatus 17 of the private network N2 on the screen 1020 and make a request to log on (a logon request).

Figure 14:
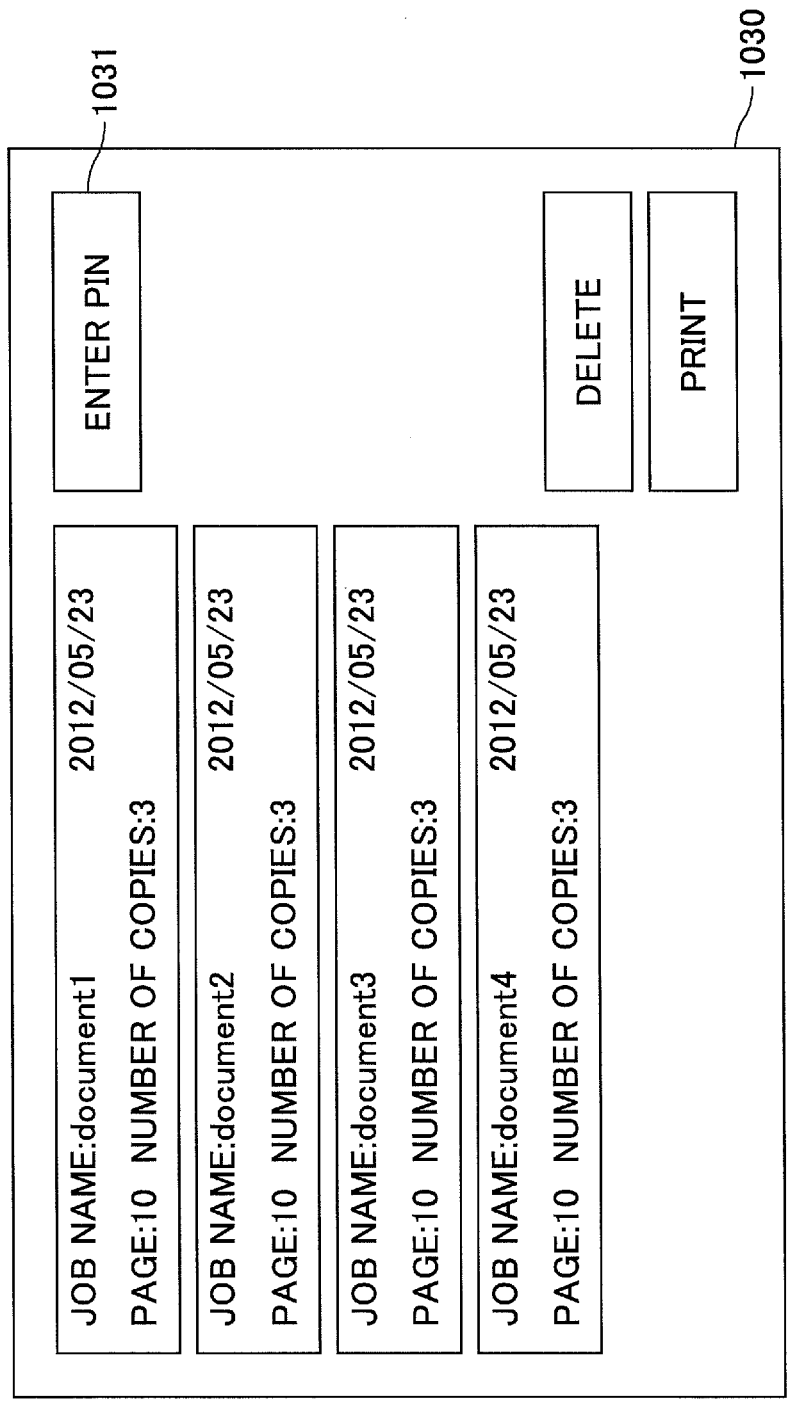
FIG. 14 is a diagram illustrating an image of a screen that displays a job list before execution of a job association process according to the first embodiment.

FIG. 14 is a diagram illustrating an image of a screen that displays a job list before execution of a job association process. A screen 1030 of FIG. 14 is displayed on the operations panel 202 (FIG. 3) of the image forming apparatus 16 operated by a user after step S52 of FIG. 10, for example. The job list of the screen 1030 is a list of print jobs input by a logon user. The user may have a screen 1040 for entering a PIN code as illustrated in FIG. 15 displayed on the operations panel 202 of the image forming apparatus 16 by depressing an ENTER PIN button 1031 of the screen 1030.

Figure 15:
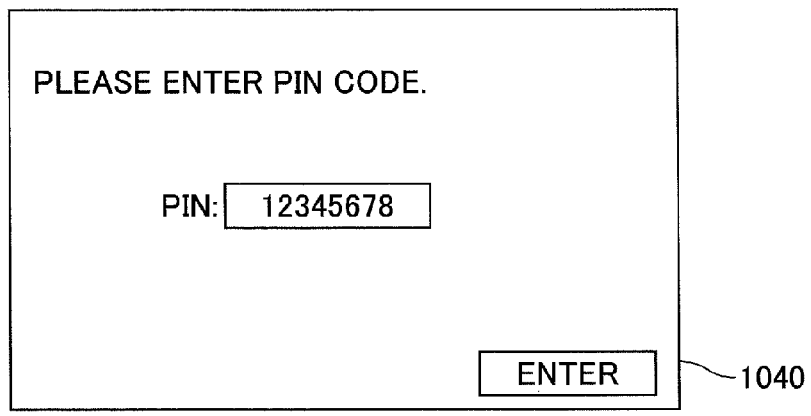
FIG. 15 is a diagram illustrating an image of a screen for entering a PIN code according to the first embodiment.

FIG. 15 is a diagram illustrating an image of a screen for entering a PIN code. The screen 1040 of FIG. 15 is displayed on the operations panel 202 (FIG. 3) of the image forming apparatus 16 operated by a user at step S21 of FIG. 9 and step S53 of FIG. 10. FIG. 15 illustrates a case where a PIN code alone is entered on the screen 1040. Alternatively, however, the screen 1040 may be so configured as to allow multiple PIN codes to be entered. A user may enter a PIN code on the screen 1040 and make a job association request.

Figure 16:
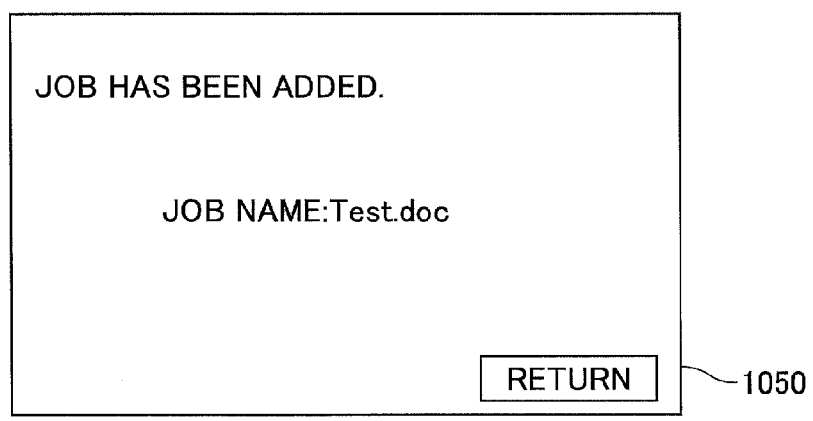
FIG. 16 is a diagram illustrating an image of a screen that reports the result of a job association process according to the first embodiment.

FIG. 16 is a diagram illustrating an image of a screen that reports the result of a job association process. A screen 1050 of FIG. 16 includes the job name of a print job that has been newly added to a job list by a job association process. A user may learn a print job with respect to which a job association process has succeeded by viewing the screen 1050.

Figure 17:
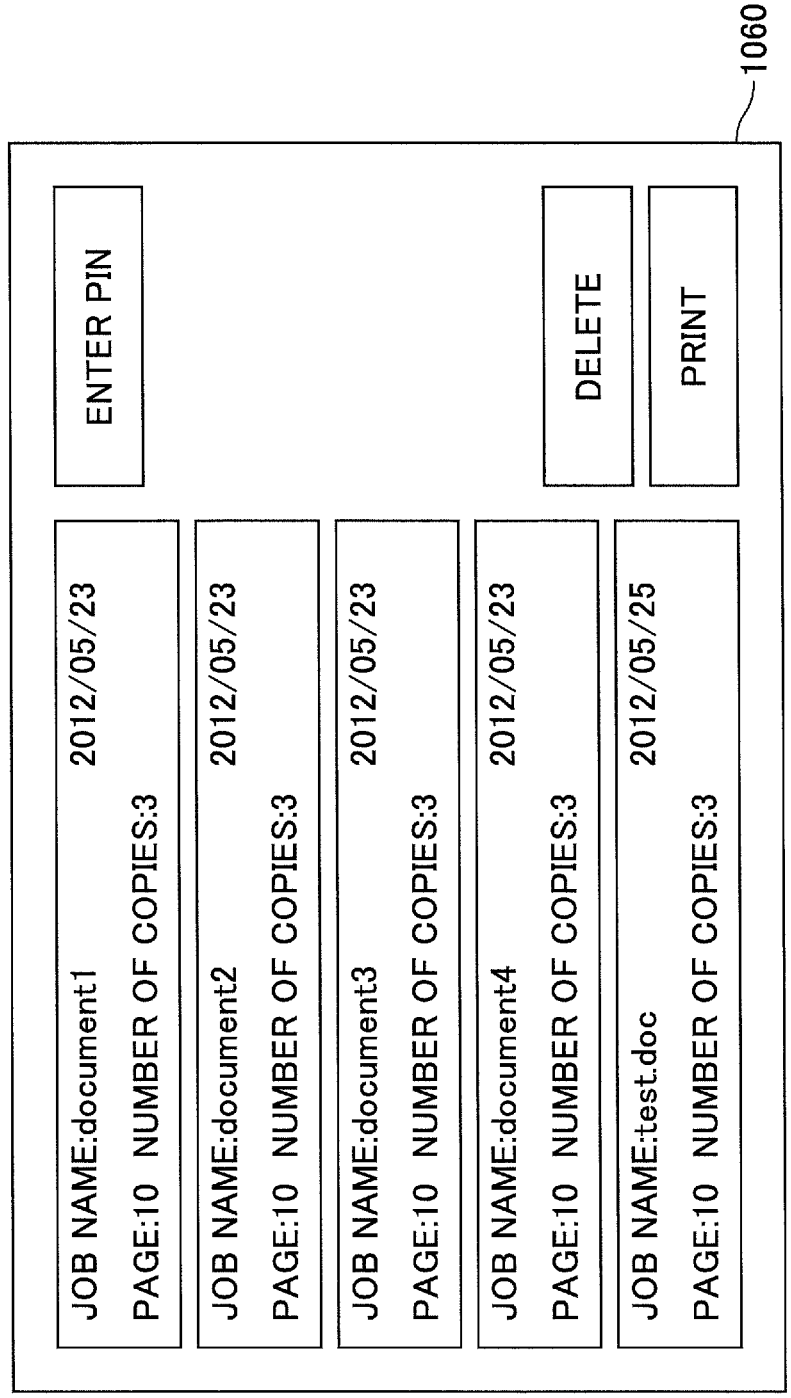
FIG. 17 is a diagram illustrating an image of a screen that displays a job list after execution of a job association process according to the first embodiment.

FIG. 17 is a diagram illustrating an image of a screen that displays a job list after execution of a job association process. Referring to a screen 1060 of FIG. 17, a print job of a job name "test.doc", with respect to which the job association process has succeeded, is added to the job list of the screen 1030 of FIG. 14. A user may select a print job with respect to which a job association process has succeeded from the job list of the screen 1060 and give an instruction to print the selected print job.

According to the printing system 1 of the first embodiment, a job identifier associated with an input print job is returned to the information terminal 12 or the client terminal 13 from which the print job has been input. After logging on to the image forming apparatus 16, a user may input the job identifier to the image forming apparatus 16 and cause the print controller 10 to associate the input print job and user information with each other.

Thereafter, the user may select a print job that the user wishes to print from a job list including the print job input from the information terminal 12 or the client terminal 13 of the public network N1 and give an instruction to print the selected print job.

According to the printing system 1 of the first embodiment, it is possible to use user authentication management performed on the private network N2 without impairing convenience at the time of executing a print job input from the information terminal 12 or the client terminal 13 of the public network N1.

Second Embodiment

According to a second embodiment, it is determined whether a user who has input a print job has been authenticated, and the same process as in the first embodiment is executed when it is determined that the user has not been authenticated. A description of the same configuration as that of the first embodiment is omitted. The system configuration and the hardware configuration are the same as those of the first embodiment.

Figure 18:
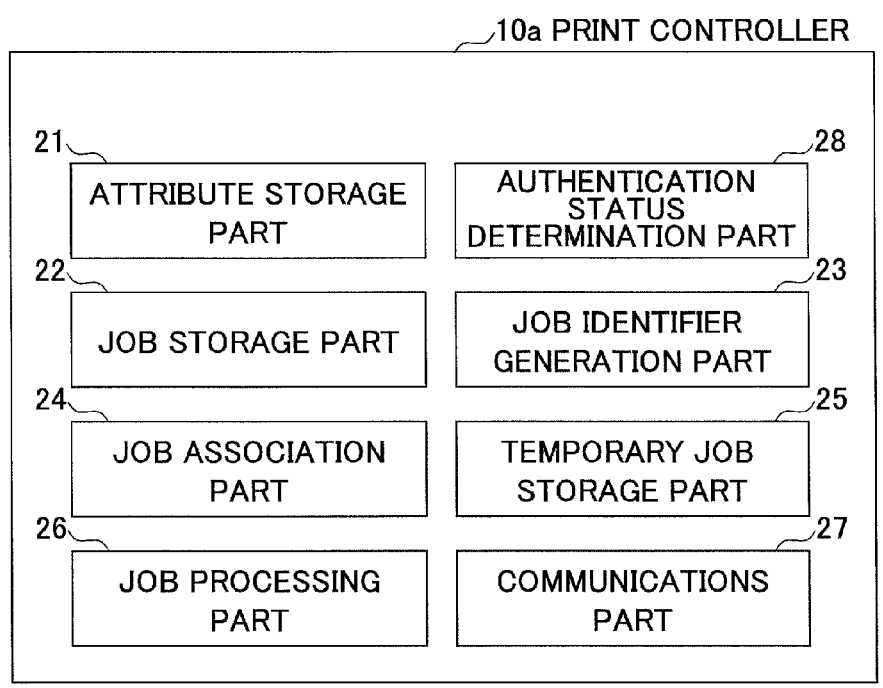
FIG. 18 is a diagram illustrating process blocks of a print controller according to a second embodiment.

With respect to the software configuration, a print controller 10a is different from that of the first embodiment. FIG. 18 is a diagram illustrating process blocks of a print controller according to this embodiment. The print controller 10a of FIG. 18 includes an authentication status determination part 28 in addition to the configuration of the print controller 10 of FIG. 4. The authentication status determination part 28 determines whether a user who has input a print job has been authenticated.

With respect to processing, the second embodiment is different from the first embodiment in the job inputting process.

Figure 19:
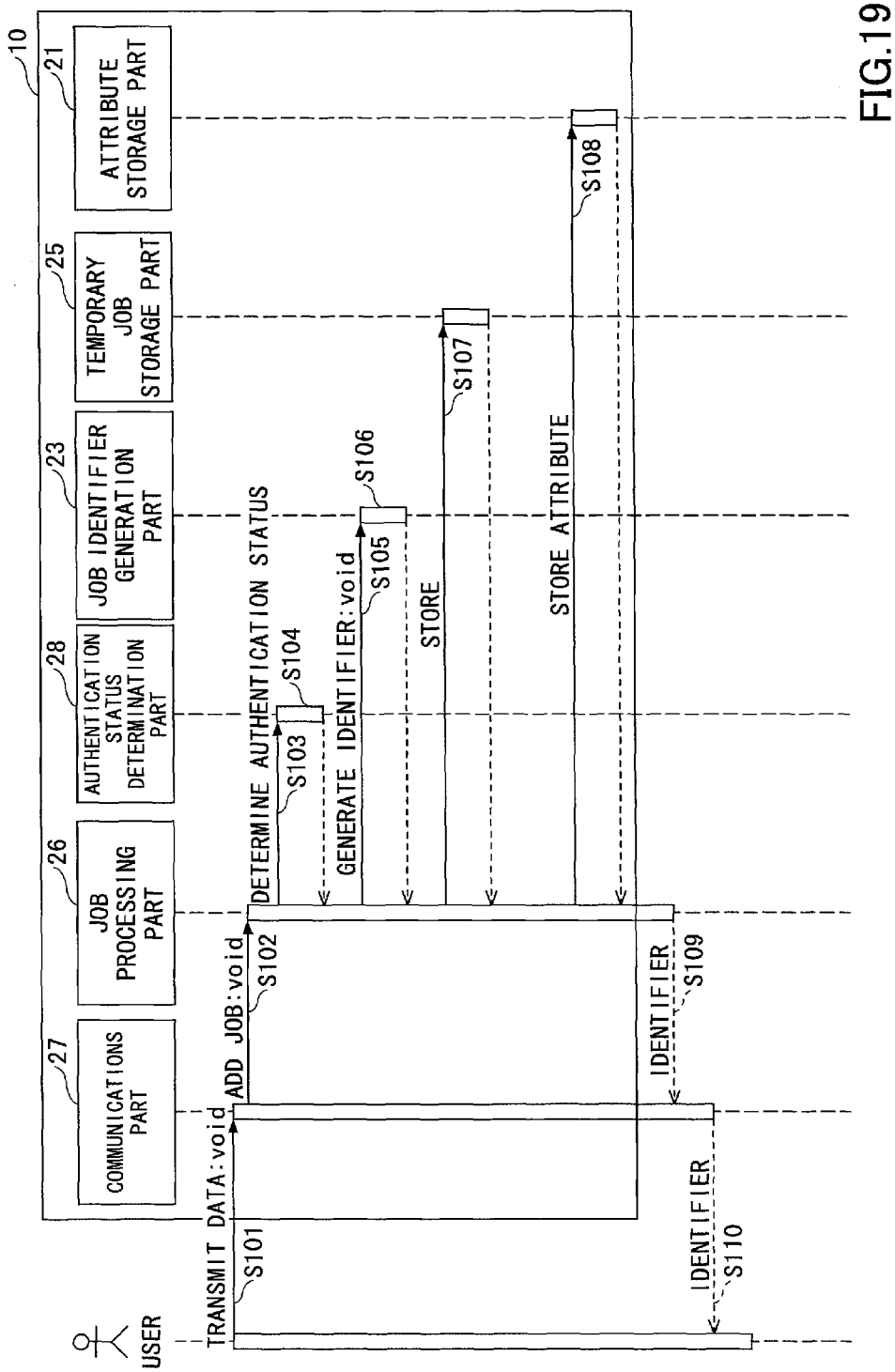
FIG. 19 is a sequence diagram illustrating a job inputting process of a printing system according to the second embodiment.

FIG. 19 is a sequence diagram illustrating a job inputting process of a printing system according to this embodiment. The sequence diagram of FIG. 19 illustrates a case where a user who inputs a print job has not been authenticated.

Referring to FIG. 19, at step S101, a user who has not been authenticated (an unauthenticated user) transmits a print job to the print controller 10 by operating the client terminal 14, the information terminal 15 or the like on the private network N2. At step S102, the communications part 27 of the print controller 10 requests the job processing part 26 to add the received print job.

At step S103, the job processing part 26 requests the authentication status determination part 28 to determine an authentication status. At step S104, the authentication status determination part 28 determines that the user has not been authenticated, and returns a determination result to that effect to the job processing part 26. The process of step S105 through step S110, after the authentication status determination part 28 returns the determination result that the user has not been authenticated to the job processing part 26, is the same as that of step S3 through step S9 of the sequence diagram of FIG. 8, and accordingly, its description is omitted.

Figure 20:
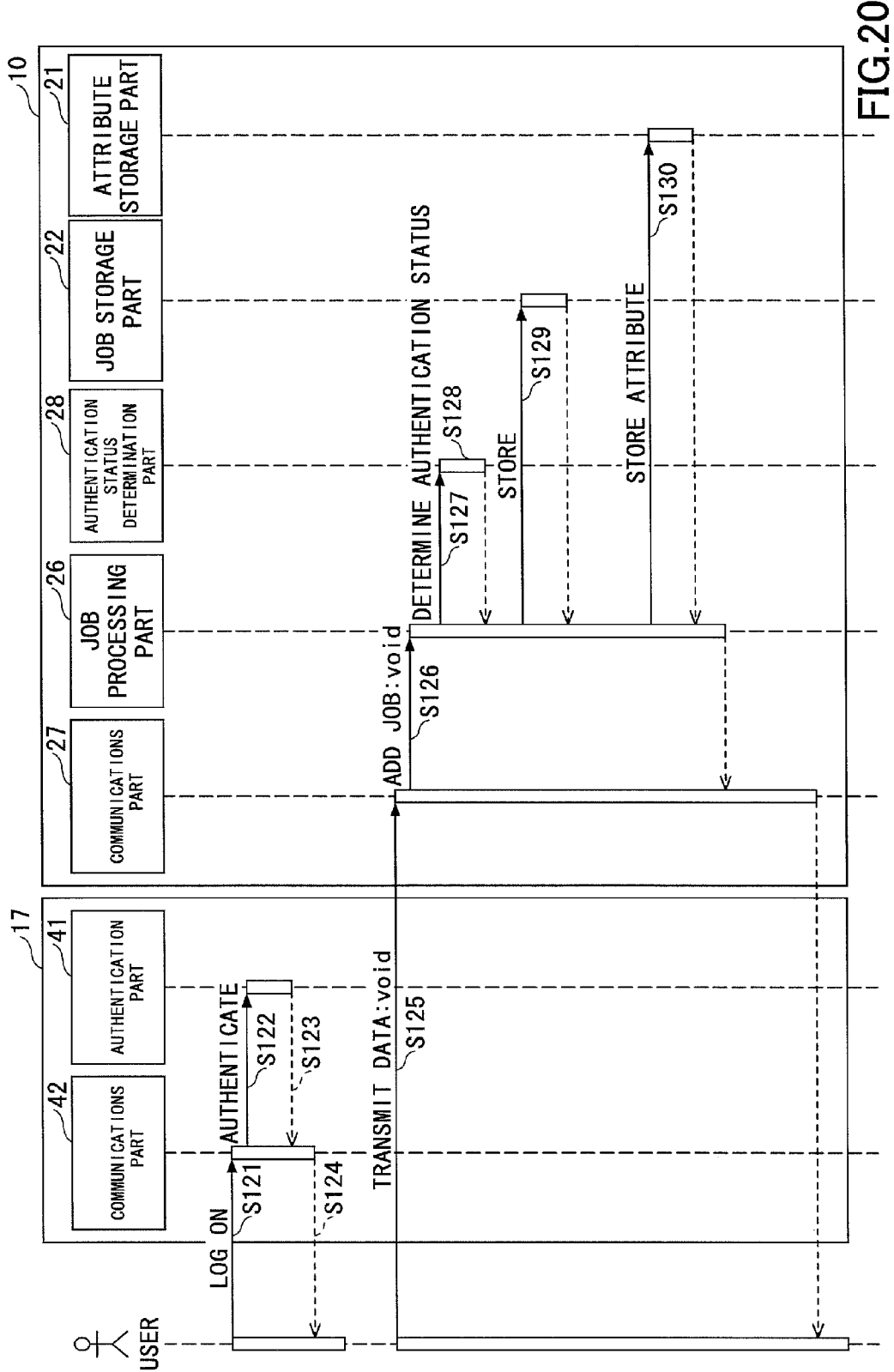
FIG. 20 is a sequence diagram illustrating another job inputting process of a printing system according to the second embodiment.

FIG. 20 is a sequence diagram illustrating another job inputting process of a printing system according to this embodiment. FIG. 20 illustrates a case where a user who inputs a print job has been authenticated.

Referring to FIG. 20, at step S121, a user operates the client terminal 14, the information terminal 15 or the like on the private network N2 to input, for example, a username, a password, etc., as authentication information for the authentication apparatus 17 of the private network N2, and makes a logon request to the authentication apparatus 17.

At step S122, the communications part 42 of the authentication apparatus 17 transmits the received authentication information to the authentication part 41 and requests authentication. If authentication succeeds with the received authentication information, at step S123, the authentication part 41 returns the authentication result of authentication success to the communications part 42. The following description is based on the assumption that the authentication has succeeded. Then, at step S124, the authentication result is returned to the user from the communications part 42 to the user operating the client terminal 14 or the information terminal 15.

At step S125, the authenticated user operates the client terminal 14, the information terminal 15 or the like on the private network N2 to transmit a print job to the print controller 10. At step S126, the communications part 27 of the print controller 10 requests the job processing part 26 to add the received print job.

At step S127, the job processing part 26 requests the authentication status determination part 28 to determine the authentication status. At step S128, the authentication status determination part 28 determines that the user has been authenticated and returns a determination result to that effect to the job processing part 26.

At step S129, the job processing part 26 stores the received print job in the job storage part 22. At step S130, the job processing part 26 causes the attribute information of the print job to be stored in the table of the attribute storage part 21 as illustrated in FIG. 7, for example.

Figure 21:
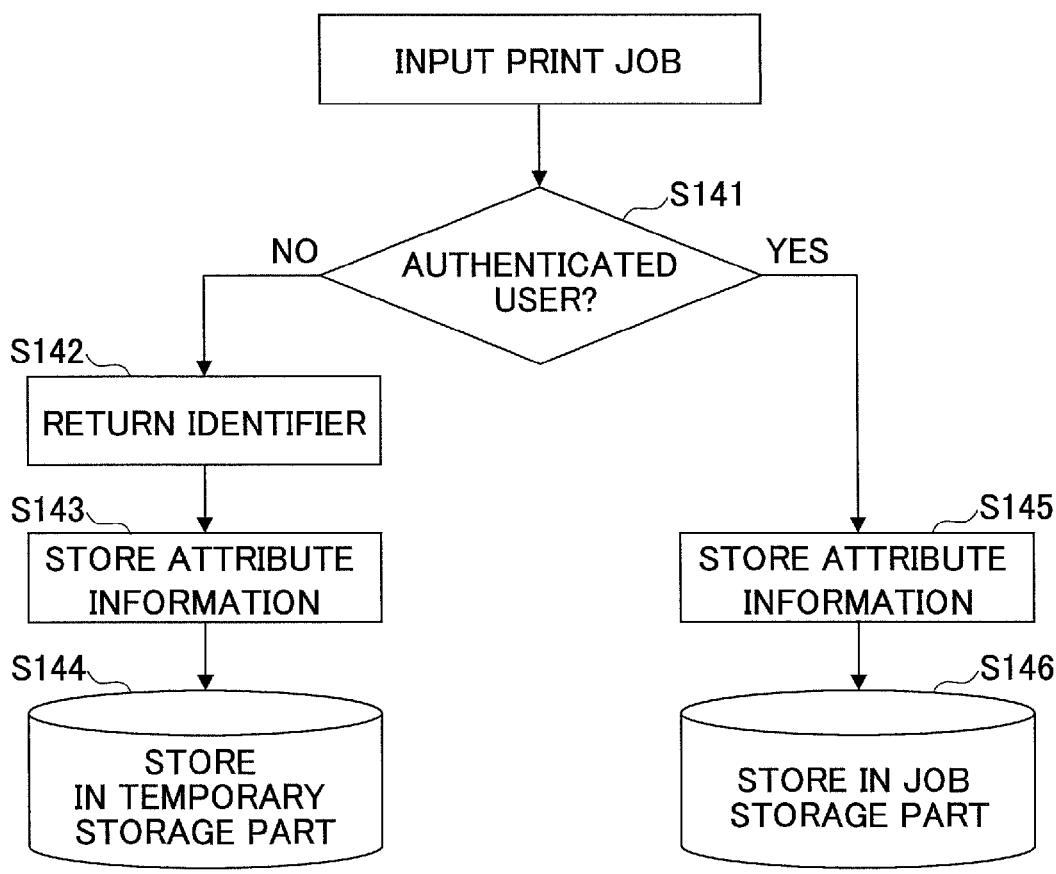
FIG. 21 is a flowchart of a process executed by a print controller according to the second embodiment.

In summary, the print controller 10 executes a process as illustrated in FIG. 21. FIG. 21 is a flowchart of a process executed by a print controller according to this embodiment. Referring to FIG. 21, at step S141, the print controller 10 determines whether a user who has input a print job has been authenticated.

If the user has been authenticated (YES at step S141), at step S145, the print controller 10 causes the attribute information of the print job to be stored in the table of the attribute storage part 21. Furthermore, at step S146, the print controller 10 stores the print job in the job storage part 22.

On the other hand, if the user has not been authenticated (NO at step S141), at step S142, the print controller 10 returns a job identifier to the client terminal 14, the information terminal 15 or the like operated by the user. At step S143, the print controller 10 causes the attribute information of the print job in the table of the attribute storage part 21. Furthermore, at step S144, the print controller 10 causes the print job and the job identifier to be associated with each other and stored (in association with each other) in the temporary job storage part 25.

Next, a description is given of screen images according to this embodiment.

Figure 22:
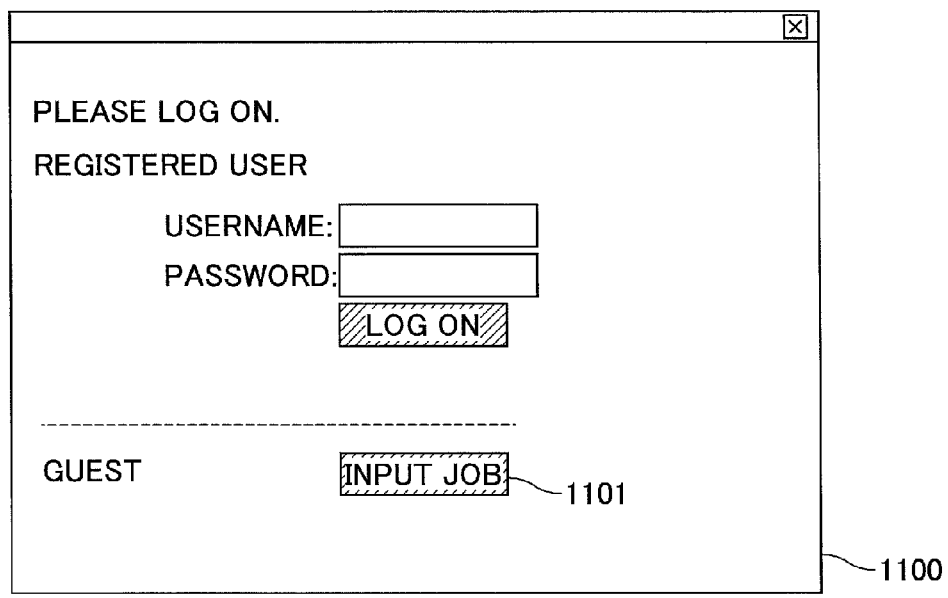
FIG. 22 is a diagram illustrating an image of a screen for logging on (a logon screen) in a job inputting process according to the second embodiment.

FIG. 22 is a diagram illustrating an image of a screen for logging on (a logon screen) in a job inputting process. A screen 1100 of FIG. 22 is displayed on the information terminal 12 or 15, the client terminal 13 or 14, or the like operated by a user before step S101 of FIG. 19 and step S121 of FIG. 20. A username, a password, etc., may be entered as authentication information on the screen 1100. Furthermore, the screen 1100 includes a job inputting button 1101 for the information terminal 12, the client terminal 13, etc., of the public network N1, which are prevented from accessing the authentication apparatus 17 of the private network N2, to input a print job without entering authentication information.

Figure 23:
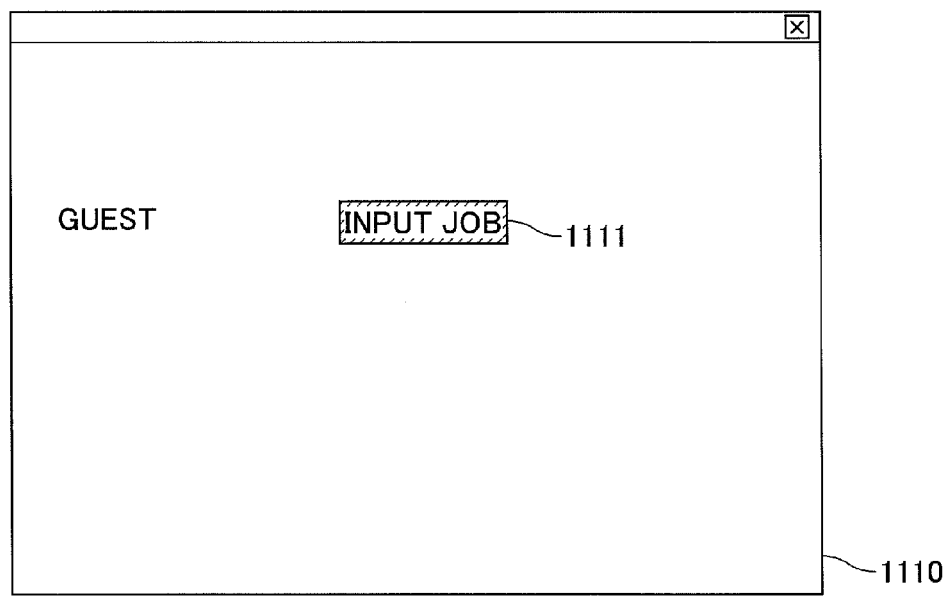
FIG. 23 is a diagram illustrating an image of another logon screen in a job inputting process according to the second embodiment.

FIG. 23 is a diagram illustrating an image of another logon screen in a job inputting process. A screen 1110 of FIG. 23 is displayed on the information terminal 12, the client terminal 13, etc., of the public network N1, which are prevented from accessing the authentication apparatus 17 of the private network N2. The screen 1110 includes a job inputting button 1111 for inputting a print job, but authentication information such as a username and a password are prevented from being entered on the screen 1110.

According to the printing system 1 of the second embodiment, it is not required to use a job identifier when inputting a print job from the client terminal 14 or the information terminal 15 of the private network N2, thus increasing usability.

Third Embodiment

According to a third embodiment, a user who has not been authenticated with authentication information is allowed to execute a print job using a PIN code. A description of the same configuration as that of the first embodiment or the second embodiment is omitted. The system configuration, hardware configuration, and software configuration are the same as those of the first embodiment or the second embodiment.

With respect to processing, the third embodiment is different from the first and the second embodiment in the job execution process.

Figure 24:
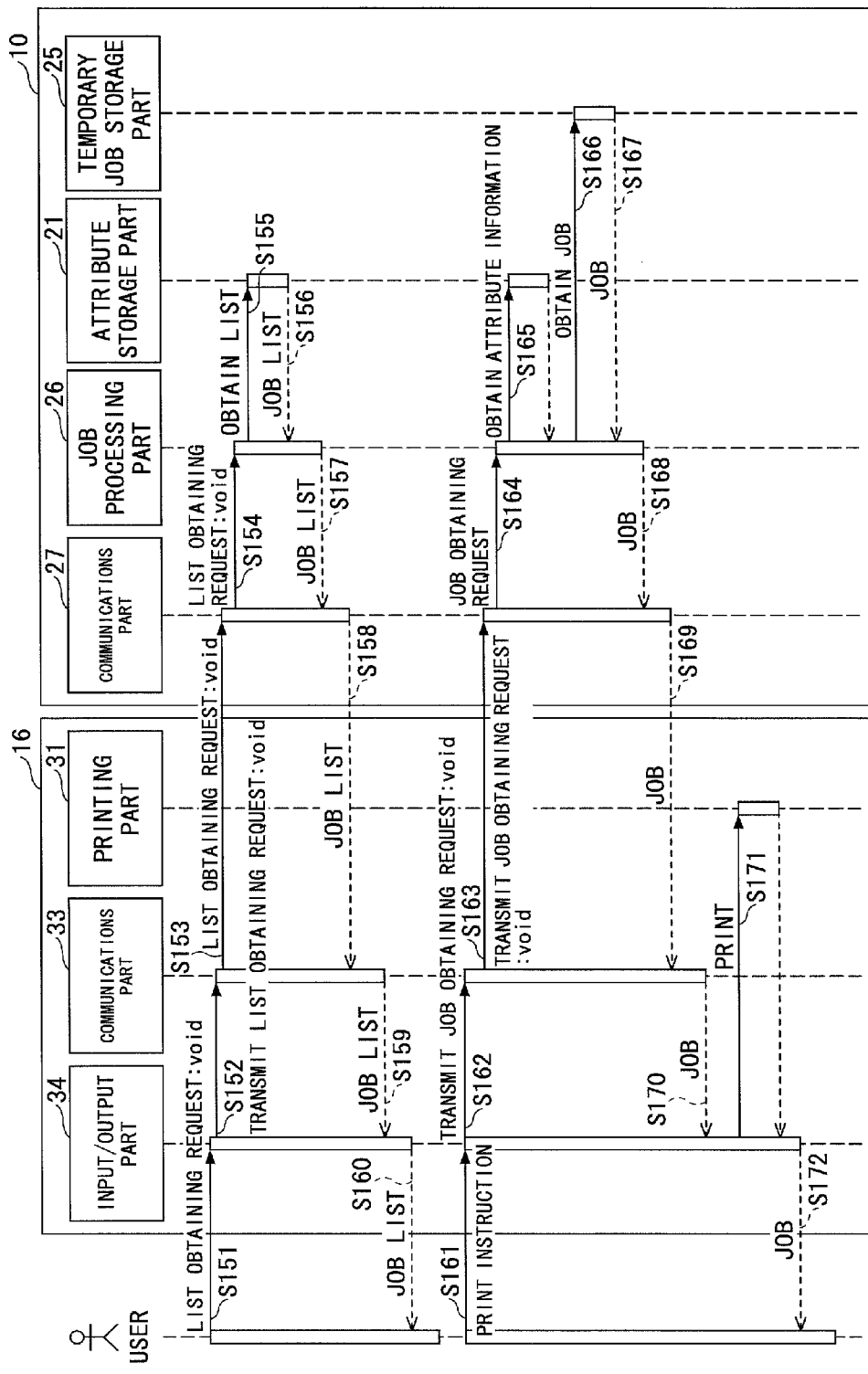
FIG. 24 is a sequence diagram illustrating a job execution process of a printing system according to a third embodiment.

FIG. 24 is a sequence diagram illustrating a job execution process of a printing system according to this embodiment. Before step S151 of FIG. 24, a user operates the image forming apparatus 16 to log on to the image forming apparatus 16 using a PIN code. Multiple PIN codes may be entered.

Referring to FIG. 24, at step S151, a user operates the image forming apparatus 16 to make a job list obtaining request. The input/output part 34 of the image forming apparatus 16 receives the job list obtaining request from the user. At step S152 and step S153, the input/output part 34 transmits the PIN code to the print controller 10 through the communications part 33 and makes a job list obtaining request.

At step S154, the communications part 27 of the print controller 10 transmits the PIN code received from the image forming apparatus 16 to the job processing part 26 and makes a job list obtaining request. At step S155 and step S156, the job processing part 26 obtains a job list including a print job that matches the PIN code from the attribute storage part 21. Then, at step S157, step S158, step S159, and step S160, the job list corresponding to the PIN code is returned from the print controller 10 to the user operating the image forming apparatus 16.

At step S161, the user operates the image forming apparatus 16 to select a print job that the user wishes to print from the job list and gives an instruction to print the selected print job (a print instruction). The input/output part 34 of the image forming apparatus 16 receives the instruction to print the selected print job from the user. At step S162 and step S163, the input/output part 34 transmits a PIN code (corresponding to the selected print job) to the print controller 10 through the communications part 33, and makes a request to obtain the print job (a print job obtaining request). At step S164, the communications part 27 of the print controller 10 transmits the PIN code received from the image forming apparatus 16 to the job processing part 26, and makes a print job obtaining request. At step S165, the job processing part 26 obtains the attribute information of a print job that matches the PIN code from the attribute storage part 21.

At step S166 and step S167, the job processing part 26 obtains the print job from the temporary job storage part 25 based on the obtained attribute information of the print job. Then, at step S168, step S169, and step S170, the print job that matches the PIN code is returned from the print controller 10 to the input/output part 34 of the image forming apparatus 16.

At step S171, the input/output part 34 transmits the received print job to the printing part 31 and causes the printing part 31 to execute printing (print the print job). Furthermore, at step S172, the print job, for which the print instruction has been received using the PIN code, is returned to the user operating the image forming apparatus 16.

A description is given of screen images according to this embodiment.

Figure 25:
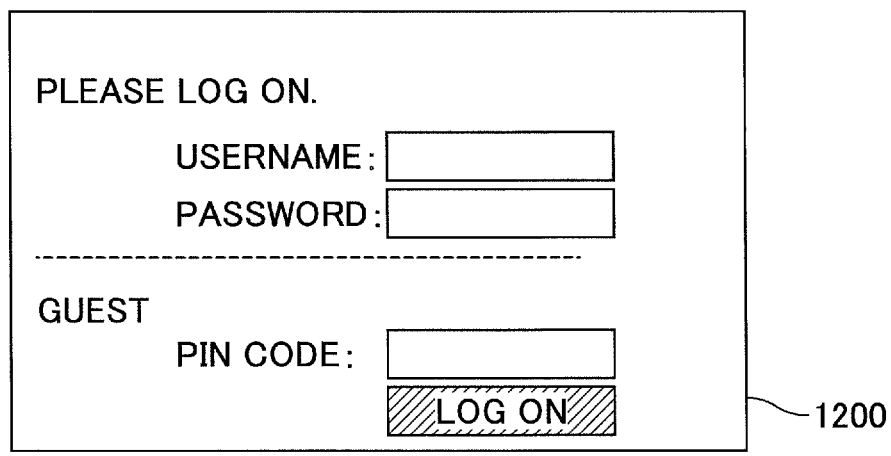
FIG. 25 is a diagram illustrating an image of a logon screen in a job execution process according to the third embodiment.

FIG. 25 is a diagram illustrating an image of a logon screen in a job execution process. A screen 1200 of FIG. 25 is displayed on the image forming apparatus 16 operated by a user before step S151 of FIG. 24.

Logon may be performed by entering a username, a password, etc., as authentication information on the screen 1200. Furthermore, logon may be performed by entering a PIN code in place of authentication information on the screen 1200.

Figure 26:
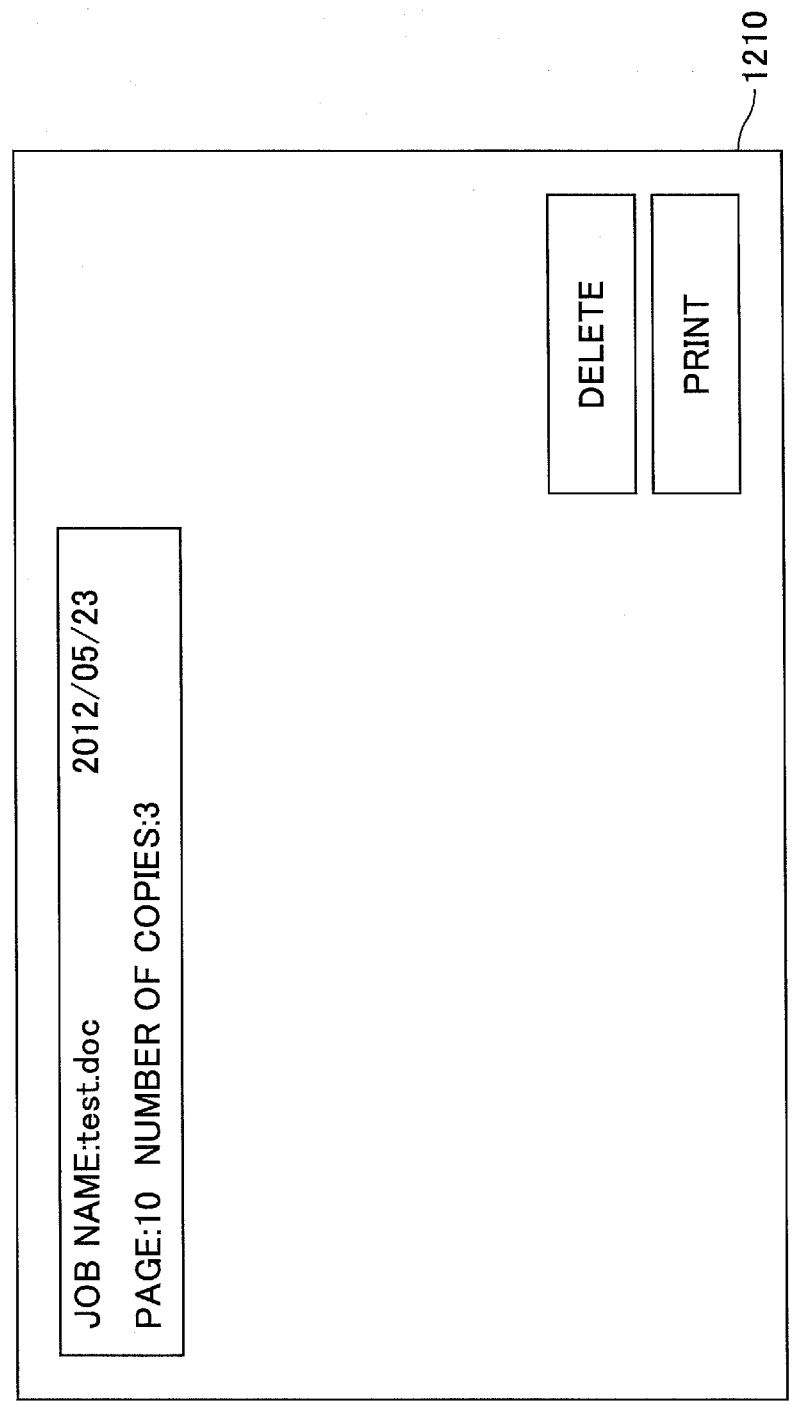
FIG. 26 is a diagram illustrating an image of a screen that displays a job list including a print job that matches a PIN code according to the third embodiment.

FIG. 26 is a diagram illustrating an image of a screen that displays a job list including a print job that matches a PIN code. A screen 1210 of FIG. 26 is displayed on the operations panel 202 (FIG. 3) of the image forming apparatus 16 operated by a user after step S160 of FIG. 24, for example. The job list of the screen 1210 is a list of one or more print jobs associated with respective PIN codes. A user may select a print job associated with a corresponding PIN code from the job list of the screen 1210 and give an instruction to print the selected print job.

According to the printing system 1 of the third embodiment, for example, when a user who is not authenticated by authentication information executes a print job using a PIN code, the authority of the user (functions available to the user) may be restricted. For example, a user who is not authenticated by authentication information may be authorized to perform only monochrome printing. Furthermore, the printing system 1 of the third embodiment may also be configured to determine whether to authorize a user who is not authenticated by authentication information to execute a print job using a PIN code and/or whether to restrict the authority of a user who is not authenticated by authentication information.

For example, by making it possible to determine whether to authorize a user who is not authenticated by authentication information to execute a print job using a PIN code or whether to restrict the authority of a user who is not authenticated by authentication information with respect to each image forming apparatus 16 (on the image forming apparatus 16 basis), it is possible for the printing system 1 of the third embodiment to increase a user's convenience.

Figure 27:
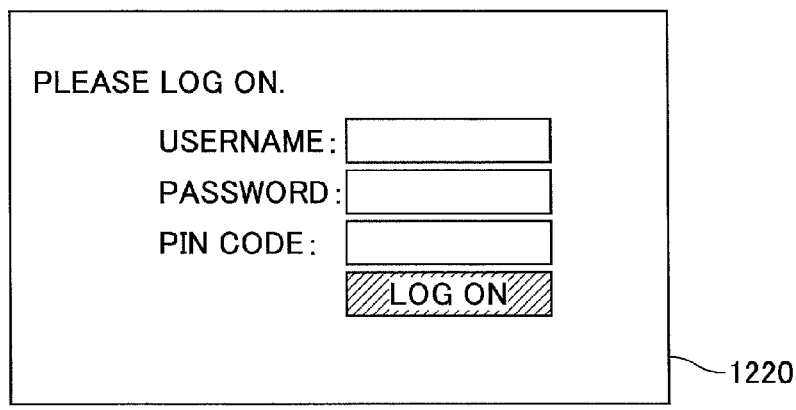
FIG. 27 is a diagram illustrating an image of another logon screen in a job execution process according to the third embodiment.

FIG. 27 is a diagram illustrating an image of another logon screen in a job execution process. A screen 1220 of FIG. 27 is displayed on the image forming apparatus 16 operated by a user before step S151 of FIG. 24, for example.

Logon may be performed by entering a username, a password, etc., as authentication information and further entering a PIN code on the screen 1220. According to the printing system 1 of the third embodiment, by using the screen 1220, it is possible to reduce the number of interactions (communications) between the image forming apparatus 16 and the print controller 10, so that it is possible to expect improved performance.

Figure 28:
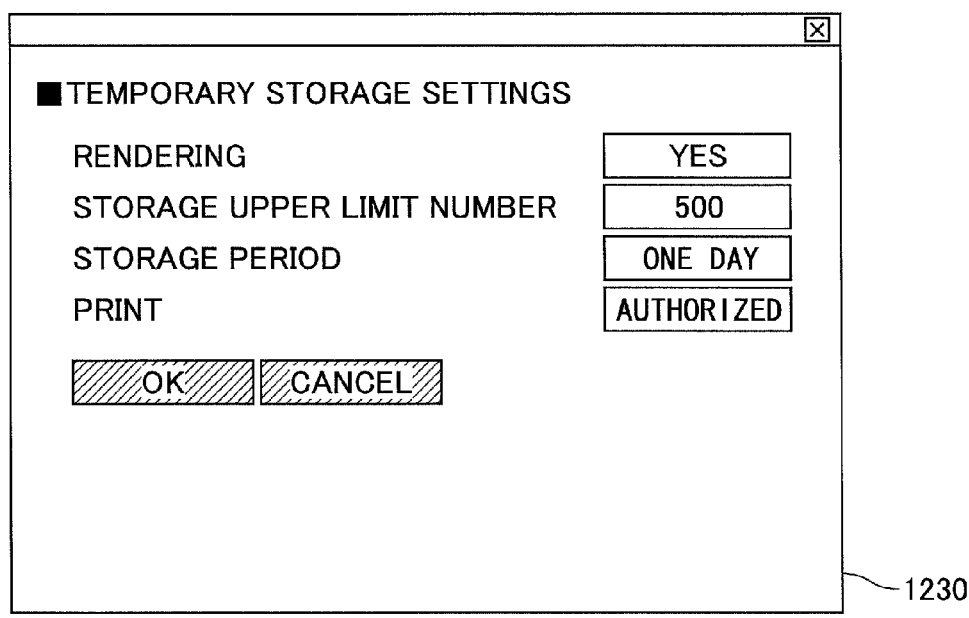
FIG. 28 is a diagram illustrating an image of a screen for setting the conditions of storage of a temporary job storage part according to the third embodiment.

FIG. 28 is a diagram illustrating an image of a screen for setting (determining) the conditions of storage (storage conditions) of a temporary job storage part. According to a screen 1230 of FIG. 28, it is possible to determine storage conditions such as whether to perform rendering, the upper limit of the number of print jobs to be stored, the period of storage, and whether to authorize printing. The screen 1230 of FIG. 28 allows a user to have the temporary job storage part 25 operate with desired storage conditions.

According to the printing system 1 of the third embodiment, a user who is not authenticated by authentication information is allowed to execute a print job using a PIN code. Accordingly, improvement in a user's convenience may be expected.

Fourth Embodiment

According to a fourth embodiment, a printing system 2 uses a cloud service.

Figure 29:
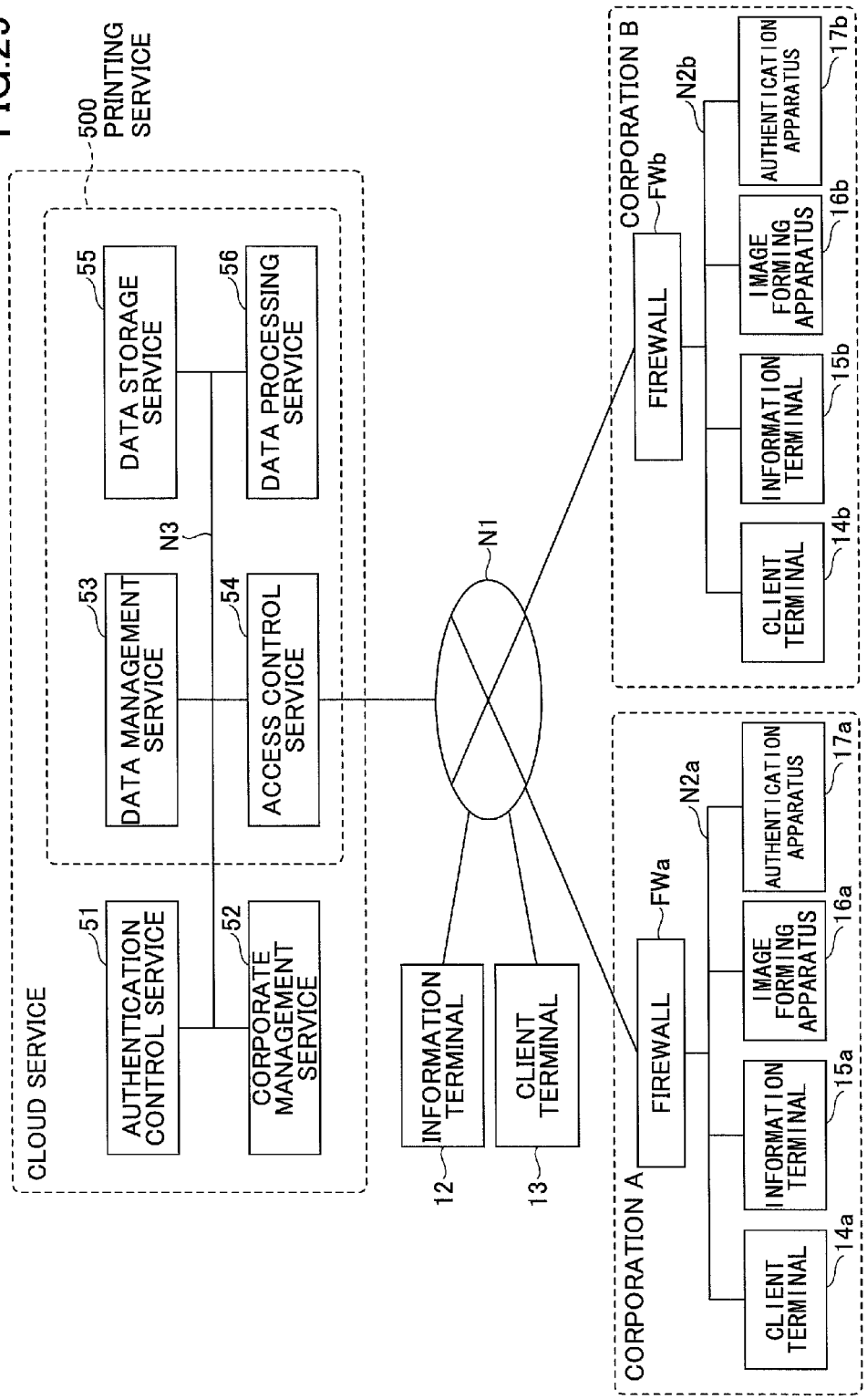
FIG. 29 is a diagram illustrating a configuration of a printing system according to a fourth embodiment.

FIG. 29 is a diagram illustrating a configuration of a printing system according to this embodiment. The printing system 2 of FIG. 29 includes the public network N1 such as the Internet, private networks N2a and N2b such as corporate networks, and a public network N3 that provides a cloud service.

The network N1 and the network N2a are connected by a firewall FWa on the network N2a side. The firewall FWa is installed at the connection of the network N1 and the network N2a, and relays access from the network N2a to the network N1.

The network N1 and the network N2b are connected by a firewall FWb on the network N2b side. The firewall FWb is installed at the connection of the network N1 and the network N2b, and relays access from the network N2b to the network N1.

The private network N2a such as a corporate network includes a client terminal 14a, an information terminal 15a, an image forming apparatus 16a, and an authentication apparatus 17a. The private network N2b such as a corporate network includes a client terminal 14b, an information terminal 15b, an image forming apparatus 16b, and an authentication apparatus 17b. The private networks N2a and N2b have the same configuration as the configuration of the private network N2 of the printing system 1 of the first embodiment. Furthermore, like in the printing system 1 of the first embodiment, the information terminal 12 and the client terminal 13 are connected to the public network N1 such as the Internet.

The network N3 that provides a cloud service includes at least one information processor (computer system) that provides one or more functions using a Web application or a server-side application. Such an information process implements an authentication control service 51, a corporate management service 52, a data management service 53, an access control service 54, a data storage service 55, and a data processing service 56 on the network N3 side.

The authentication control service 51 corresponds to the authentication controller 11 of the printing system 1 of the first embodiment. The authentication control service 51 controls (determines) whether to authorize usage of a cloud service (individual services) based on the result of authentication by the authentication apparatus 17a or 17b. The corporate management service 52 manages corporate information and device information, and controls (determines) whether to authorize usage of a service with respect to each service.

According to the printing system 2 of the fourth embodiment, the data management service 53, the access control service 54, the data storage service 55, and the data processing service 56 implement a printing service 500, which corresponds to the print controller 10 of the printing system 1 of the first embodiment.

The data management service 53 manages data (input data, data conversion requests, etc.) and executes processes (such as transmission of a job list, transmission of a job, and deletion of a job) responding to a logon user's requests. The data management service 53 is implemented by a single information processor or two or more information processors in cooperation with each other. The access control service 54 controls logon to each service.

The data storage service 55 stores electronic data such as picture data, image data, document data, and print data. The data storage service 55, which may include multiple services, is implemented by a single information processor or two or more information processors in cooperation with each other.

The data processing service 56 executes processes on data input by a user, such as a data conversion process and a data transfer and storage process. The data processing service 56 is implemented by a single information processor or two or more information processors in cooperation with each other.

For example, the data storage service 55 stores (accumulates) print jobs. The data processing service 56 reads a print job of application data from the data storage service 55, converts the read print job into print data, and re-stores the print job (of print data) in the data storage service 55. The data processing service 56 may perform conversion into print data, which is performed by a printer driver of the client terminal 13, for example. Therefore, according to the printing system 2 of this embodiment, it is possible to input a print job of application data from the information terminal 12 without a printer driver and execute printing from, for example, the image forming apparatus 16a.

A user inputs a print job to the printing service 500 from the information terminal 12 or the client terminal 13 of the public network N. At this point, according to the printing system 2 of the fourth embodiment, the information terminal 12 or the client terminal 13, from which the print job has been input, obtains a job identifier associated with the print job from the printing service 500.

After inputting the print job, the user logs on to, for example, the image forming apparatus 16a and inputs the job identifier obtained at the time of inputting the print job to the image forming apparatus 16a. According to the printing system 1 of the first embodiment, the image forming apparatus 16 may cause the print controller 10 to associate the input print job with user information by making a job association request including the user information and the job identifier.

On the other hand, according to the fourth embodiment, the printing system 2 includes the private network N2a of Corporation A and the private network N2b of Corporation B. Therefore, for example, the same username may be registered with both Corporation A and Corporation B. For example, if the same username is registered with both Corporation A and Corporation B, this situation cannot be addressed by causing the printing service 500 to associate the input print job with user information alone. Therefore, according to the printing system 2 of the fourth embodiment, the printing service 500 is caused to associate an input print job, user information, and a corporate code (group information) with one another.

Then, for example, after logging on to the image forming apparatus 16a, the user gives an instruction to display a list of print jobs. The image forming apparatus 16a obtains a job list including the print job input from the information terminal 12 or the client terminal 13 of the public network N1 from the printing service 500, and displays the obtained job list. The user selects a print job that the user wishes to print from the job list and gives an instruction to print the selected print job (a print instruction). The image forming apparatus 16a obtains, from the printing service 500, the print job for which the print instruction has been received, and executes printing (prints the obtained print job).

The hardware configuration is the same as that of the first embodiment.

Figures 30, 31:
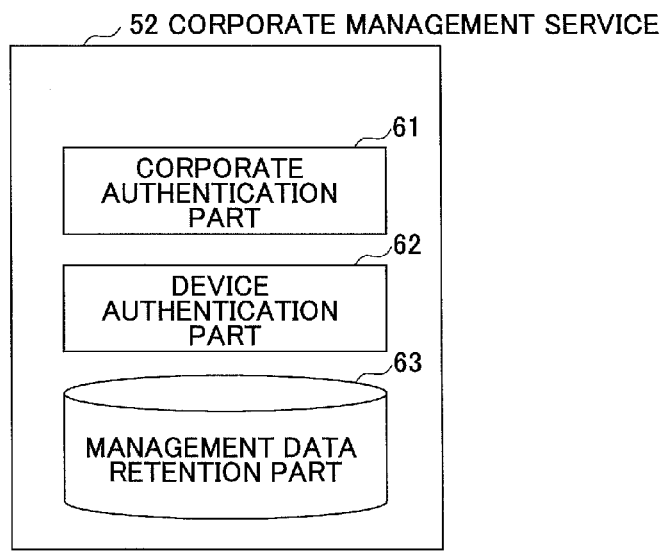
FIG. 30 is a diagram illustrating process blocks of a corporate management service according to the fourth embodiment.
FIG. 31 is a diagram illustrating a configuration of a table in which a management data retention part retains corporate information and device information according to the fourth embodiment.

With respect to the software configuration, the corporate management service 52 is a difference from the printing system 1 of the first embodiment. FIG. 30 is a diagram illustrating process blocks of a corporate management service according to this embodiment. The corporate management service 52 includes a corporate authentication part 61, a device authentication part 62, and a management data retention part 63.

The corporate authentication part 61 performs an authentication determination on a corporate code included in an authentication request received via the network N1 based on the corporate codes retained by the management data retention part 63. The corporate code is an example of identification information that identifies a corporation, an organization, a group or the like. The device authentication part 62 performs an authentication determination on device information (such as a device ID or an application ID) included in an authentication request received via the network N1 based on the device information retained by the management data retention part 63. The device information is an example of identification information that identifies a device such as the image forming apparatus 16*a*. The management data retentions part 63 retains management data such as user information, corporate information, and device information.

FIG. 31 is a diagram illustrating a configuration of a table in which a management data retention part retains corporate information and device information. The table of FIG. 31 correlates corporate information, a corporate code, and device information with one another. For example, the table of FIG. 31 shows that a corporation of Corporation A having a corporate code "XXX" possesses devices (apparatuses) of device information "111," "222," and "333."

Figures 32A, 32B:
FIGS. 32A and 32B are diagrams illustrating a configuration of a table in which an attribute storage part stores attribute information according to the fourth embodiment.

FIGS. 32A and 32B are diagrams illustrating a configuration of a table in which an attribute storage part stores attribute information (an attribute information storage table). The table of FIG. 32 storing attribute information includes data items such as Job ID, Corporate Code, Username, PIN Code, and Bibliographic Information. The data item of Bibliographic Information includes data items such as Job Name, Input Time, Size, Storage Location, Page, Duplex/Simplex, and Number of Copies.

FIG. 32A illustrates a table before a job association process. When a job association process is performed on a print job indicated by a job ID "1" in response to a registration request made with a PIN code "PIN12345678" by a user of a username "user0001" of Corporation A, the table after the job association process is as illustrated in FIG. 32B. In FIG. 32A, by making a job association request that includes a corporate code, a username, and a job identifier, it is possible to cause the printing service 500 to associate an input print job (corresponding to the job identifier) with the corporate code and the username.

With respect to processing, the fourth embodiment is different from the first and the second embodiment in the job association process.

FIG. 33 is a flowchart of a job association process of a printing system according to this embodiment. Referring to FIG. 33, at step S201, a user operates, for example, the image forming apparatus 16*a* to input, for example, a username and a password as authentication information for the authentication apparatus 17*a* of the private network N2*a* and makes a logon request. The authentication information may be a card ID or the like correlated with a username and a password. The image forming apparatus 16*a* receives the authentication information input by the user. At step S202, the image forming apparatus 16*a* transmits the received authentication information to the authentication apparatus 17*a* and requests authentication.

At step S203, the authentication apparatus 17*a* performs authentication with the received authentication information. If authentication fails with the received authentication information, at step S204, the authentication apparatus 17*a* returns the authentication result of authentication failure to the image forming apparatus 16*a*. If authentication succeeds with the received authentication information, at step S205, the authentication apparatus 17*a* returns the authentication result of authentication success to the image forming apparatus 16*a*. The authentication result is returned from the authentication apparatus 17*a* to the user operating the image forming apparatus 16*a*.

When the authentication result is authentication success, at step S206, the user operates the image forming apparatus 16*a* to input a job identifier reported to the user at the time of inputting the print job, and makes a job association request.

The image forming apparatus 16*a* receives the job identifier input by the user.

At step S207, the image forming apparatus 16*a* transmits a corporate code and device information retained as configuration (setting) information, the job identifier (PIN code) received from the user, and a username with respect to which authentication has succeeded to the printing service 500, and makes a job association request.

At step S208, the printing service 500 causes the corporate management service 52 to perform corporate authentication determination with respect to the received corporate code. The corporate management service 52 performs corporate authentication determination with respect to the received corporate code based on the corporate codes retained by the management data retention part 63. If authentication fails with the received corporate code, at step S210, the corporate management service 52 returns the authentication result of authentication failure to the image forming apparatus 16*a*. If authentication succeeds with the received corporate code, the corporate management service 52 returns the authentication result of authentication success to the printing service 500.

In response to reception of the authentication result of authentication success, at step S209, the printing service 500 causes the corporate management service 52 to perform device authentication determination with respect to the received device information. The corporate management service 52 performs device authentication determination with respect to the received device information based on the device information retained by the management data retention part 63.

If authentication fails with the received device information, at step S210, the corporate management service 52 returns the authentication result of authentication failure to the image forming apparatus 16*a*. If authentication succeeds with the received device information, the corporate management service 52 returns the authentication result of authentication success to the printing service 500.

The printing service 500 collates the received job identifier with the job identifiers of the table as illustrated in FIGS. 32A and 32B. If no print job corresponding to the received job identifier is registered with the table illustrated in FIGS. 32A and 323, at step S212, the printing service 500 returns the result of job association failure to the image forming apparatus 16*a*.

If a print job corresponding to the received job identifier is registered with the table illustrated in FIGS. 32A and 32B, at step S213, the printing service 500 selects a record corresponding to the received job identifier from the table illustrated in FIGS. 32A and 32B. Then, the printing service 500 obtains a print job corresponding to the job identifier from the temporary job storage part 25 based on the record corresponding to the received job identifier, and stores the obtained print job in the job storage part 22.

The printing service 500 updates the data of Corporate Code and Username of the record corresponding to the received job identifier, selected from the table illustrated in FIGS. 32A and 32B, to the corporate code and username received from the image forming apparatus 16*a* in the job association request.

According to the printing system 2 of the fourth embodiment, the problem that causing a printing service to associate an input print job with user information alone cannot address, for example, the situation where the same username is registered with both Corporation A and Corporation B, is solved by causing the printing service to associate the input print job with user information and a corporate code.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention.

The printing systems 1 and 2 of the above-described embodiments are examples of output systems, and the image forming apparatuses 16, 16*a* and 16*b* are examples of output apparatuses.

Output apparatuses are not limited to the image forming apparatuses 16, 16*a* and 16*b*, and may be any apparatuses that output image data or the like, such as projection apparatuses including projectors and apparatuses that display image data.

What is claimed is:

1. An information processing apparatus, comprising:
    a processor; and
    a memory storing a program that, when executed by the processor, causes the information processing apparatus to
        connect to an output apparatus via a network, the output apparatus performing a logon process of a user, obtaining a job from the information processing apparatus based on user information of the user logging on to the output apparatus, and outputting the job;
        receive the job without the user information, the job being transmitted from a terminal apparatus by the user;
        store first information in a first information storage part, the first information correlating a job identifier and the received job without association with the user information of the user having transmitted the received job;
        transmit the job identifier correlated with the received job to the terminal apparatus;
        receive a job association request including the user information and the job identifier; and
        specify the job based on the job identifier included in the job association request and the first information, and store second information in the second information storage part, the second information correlating the specified job and the user information included in the job association request,
    wherein the job obtained by the output apparatus is specified based on the user information of the user logging on to the output apparatus and the second information.

2. The information processing apparatus as claimed in claim 1, wherein the program further causes the information processing apparatus to
    determine an authentication status of the user when receiving the job;
    generate the job identifier for the received job when determining that the user has not been authenticated; and
    store the received job in association with the user information of the user in the second information storage part when determining that the user has been authenticated, and store the received job in association with the generated job identifier when determining that the user has not been authenticated,
wherein
    the information processing apparatus receives the job with the user information and stores the received job in association with the user information received with the job in the second information storage part, when determining that the user has been authenticated, and
    the information processing apparatus receives the job without the user information when determining that the user has not been authenticated.

3. The information processing apparatus as claimed in claim 1,
    wherein the program further causes the information processing apparatus to, in response to receiving a job obtaining request including the job identifier from the output apparatus, transmit the job correlated with the job identifier included in the job obtaining request to the output apparatus based on the first information stored in the first information storage part.

4. The information processing apparatus as claimed in claim 3, wherein the program further causes the information processing apparatus to, in response to receiving a job list obtaining request including the job identifier from the output apparatus, transmit a job list including the job correlated with the job identifier included in the job list obtaining request based on the first information stored in the first information storage part.

5. The information processing apparatus as claimed in claim 1, wherein the program further causes the information processing apparatus to set a condition for storing the job in the first information storage part.

6. The information processing apparatus as claimed in claim 1, wherein the information processing apparatus and the terminal apparatus are on a public network and the output apparatus is on a private network.

7. A system, comprising:
    an information processing apparatus; and
    an output apparatus configured to perform a logon process of a user, obtain a job from the information processing apparatus based on user information of the user logging on to the output apparatus, and outputting the job,
    wherein the information processing apparatus includes
    a first processor; and
    a first memory storing a first program that, when executed by the first processor, causes the information processing apparatus to
        connect to the output apparatus via a network;
        receive the job without the user information, the job being transmitted from a terminal apparatus by the user;
        store first information in a first information storage part, the first information correlating a job identifier and the received job without association with the user information of the user having transmitted the received job;
        transmit the job identifier correlated with the received job to the terminal apparatus;
        receive a job association request including the user information and the job identifier; and
        specify the job based on the job identifier included in the job association request and the first information, and store second information in the second information storage part, the second information correlating the specified job and the user information included in the job association request,
    wherein the job obtained by the output apparatus is specified based on the user information of the user logging on to the output apparatus and the second information, and wherein the output apparatus includes
a second processor; and
a second memory storing a second program that, when executed by the second processor, causes the output apparatus to
authenticate the user; and
make the job association request to the information processing apparatus using the user information and the job identifier.

8. The system as claimed in claim 7, wherein the first program further causes the information processing apparatus to
determine an authentication status of the user when receiving the job;
generate the job identifier for the received job when determining that the user has not been authenticated; and
store the received job in association with the user information of the user in the second information storage part when determining that the user has been authenticated, and store the received job in association with the generated job identifier when determining that the user has not been authenticated,
wherein
the information processing apparatus receives the job with the user information and stores the received job in association with the user information received with the job in the second information storage part, when determining that the user has been authenticated, and
the information processing apparatus receives the job without the user information when determining that the user has not been authenticated.

9. The system as claimed in claim 7,
wherein the first program further causes the information processing apparatus to, in response to receiving a job obtaining request including the job identifier from the output apparatus, transmit the job correlated with the job identifier included in the job obtaining request to the output apparatus based on the first information stored in the first information storage part.

10. The system as claimed in claim 9, wherein the first program further causes the information processing apparatus to, in response to receiving a job list obtaining request including the job identifier from the output apparatus, transmit a job list including the job correlated with the job identifier included in the job list obtaining request based on the first information stored in the first information storage part.

11. The system as claimed in claim 9, wherein the second program further causes the output apparatus to
make the job obtaining request to the information processing apparatus using at least one of the user information and the job identifier;
execute the job correlated with the job identifier and received from the information, processing apparatus; and
restrict available functions of the output apparatus in a case of making the job obtaining request to the information processing apparatus using the job identifier without using the user information.

12. The system as claimed in claim 7, wherein the information processing apparatus and the terminal apparatus are on a public network and the output apparatus is on a private network.

13. A non-transitory computer-readable recording medium having a program recorded thereon, wherein the program, when executed by a processor of an information processing apparatus, causes the information processing apparatus to
connect to an output apparatus via a network, the output apparatus performing a logon process of a user, obtaining a job from the information processing apparatus based on user information of the user logging on to the output apparatus, and outputting the job;
receive the job without the user information, the job being transmitted from a terminal apparatus by the user;
store first information in a first information storage part, the first information correlating a job identifier and the received job without association with the user information of the user having transmitted the received job;
transmit the job identifier correlated with the received job to the terminal apparatus;
receive a job association request including the user information and the job identifier; and
specify the job based on the job identifier included in the job association request and the first information, and store second information in the second information storage part, the second information correlating the specified job and the user information included in the job association request,
wherein the job obtained by the output apparatus is specified based on the user information of the user logging on to the output apparatus and the second information.

* * * * *